United States Patent
Tanaka

(10) Patent No.: US 10,037,775 B2
(45) Date of Patent: Jul. 31, 2018

(54) OPTICAL INFORMATION DEVICE AND OPTICAL INFORMATION PROCESSING METHOD

(71) Applicant: Hitachi Consumer Electronics Co., Ltd., Yokohama-shi, Kanagawa (JP)

(72) Inventor: Yukinobu Tanaka, Tokyo (JP)

(73) Assignee: Hitachi Consumer Electronics Co., Ltd., Yokohama-shi (JP)

( * ) Notice: Subject to any disclaimer, the term of this patent is extended or adjusted under 35 U.S.C. 154(b) by 0 days.

(21) Appl. No.: 15/111,534

(22) PCT Filed: Jan. 29, 2014

(86) PCT No.: PCT/JP2014/051887
§ 371 (c)(1),
(2) Date: Jul. 14, 2016

(87) PCT Pub. No.: WO2015/114743
PCT Pub. Date: Aug. 6, 2015

(65) Prior Publication Data
US 2016/0336033 A1  Nov. 17, 2016

(51) Int. Cl.
*G11B 7/0065* (2006.01)
*G03H 1/22* (2006.01)
(Continued)

(52) U.S. Cl.
CPC ......... *G11B 7/0065* (2013.01); *G03H 1/2205* (2013.01); *G03H 1/2286* (2013.01);
(Continued)

(58) Field of Classification Search
None
See application file for complete search history.

(56) References Cited

U.S. PATENT DOCUMENTS

| 7,589,877 B2 | 9/2009 | Anderson et al. |
| 2005/0088923 A1 | 4/2005 | Kim |
| 2010/0074074 A1 | 3/2010 | Kanamaru et al. |

FOREIGN PATENT DOCUMENTS

| JP | 6-109958 A | 4/1994 |
| JP | 2001-209965 A | 8/2001 |

(Continued)

OTHER PUBLICATIONS

International Search Report (PCT/ISA/210) issued in PCT Application No. PCT/JP2014/051887 dated Mar. 11, 2014 with English translation (5 pages).

*Primary Examiner* — Brian Butcher
(74) *Attorney, Agent, or Firm* — Crowell & Moring LLP

(57) ABSTRACT

An optical information device and an optical information processing method which can perform high-speed and accurate positioning are provided. An optical information device which reproduces information from and/or records information on an optical information recording medium on which interference patterns between signal light and reference light are recorded as a hologram includes: an optical system which emits an optical beam; an aperture unit which passes at least a portion of reproduced light acquired when the optical beam from the optical system is radiated onto the optical information recording medium; a first detection unit which detects at least a portion of the reproduced light; a second detection unit which detects the position of the aperture unit; and a control unit which, based on a first signal acquired from the first detection unit and a second signal acquired from the second detection unit, controls the position of the aperture unit.

9 Claims, 21 Drawing Sheets

(51) Int. Cl.
   *G11B 7/1381*    (2012.01)
   *G03H 1/26*      (2006.01)
   *G11B 7/1353*    (2012.01)
   *G11B 7/0037*    (2006.01)

(52) U.S. Cl.
   CPC ........... *G03H 1/265* (2013.01); *G11B 7/1353* (2013.01); *G11B 7/1381* (2013.01); *G03H 2001/2207* (2013.01); *G11B 7/0037* (2013.01)

(56) References Cited

FOREIGN PATENT DOCUMENTS

| | | |
|---|---|---|
| JP | 2005-129196 A | 5/2005 |
| JP | 2007-304263 A | 11/2007 |
| JP | 2008-197575 A | 8/2008 |
| JP | 2010-79987 A | 4/2010 |

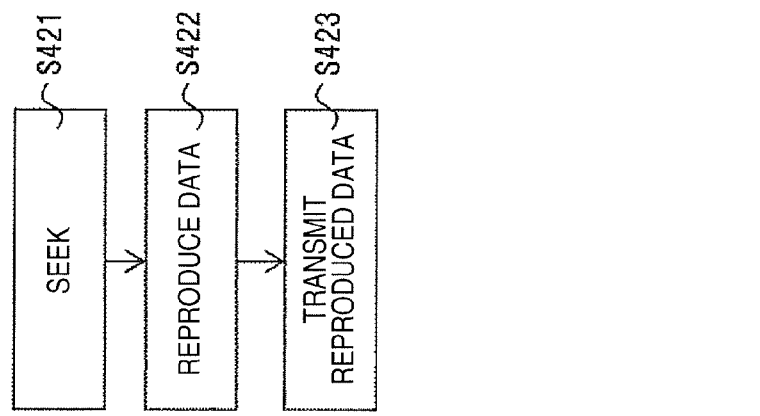
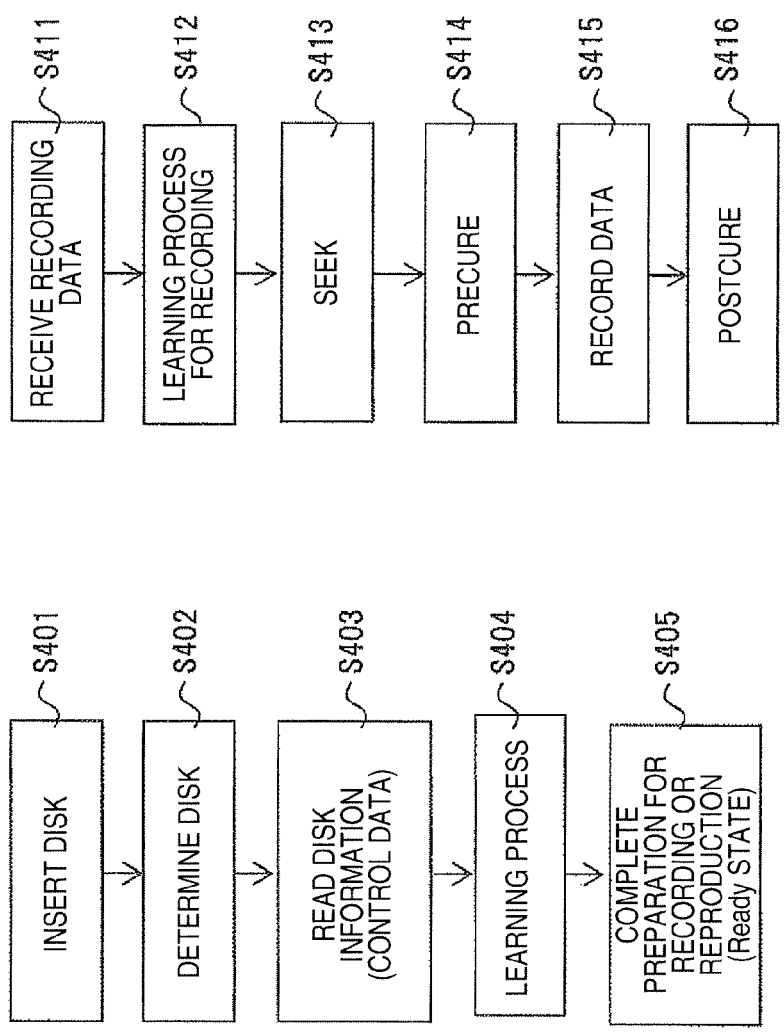

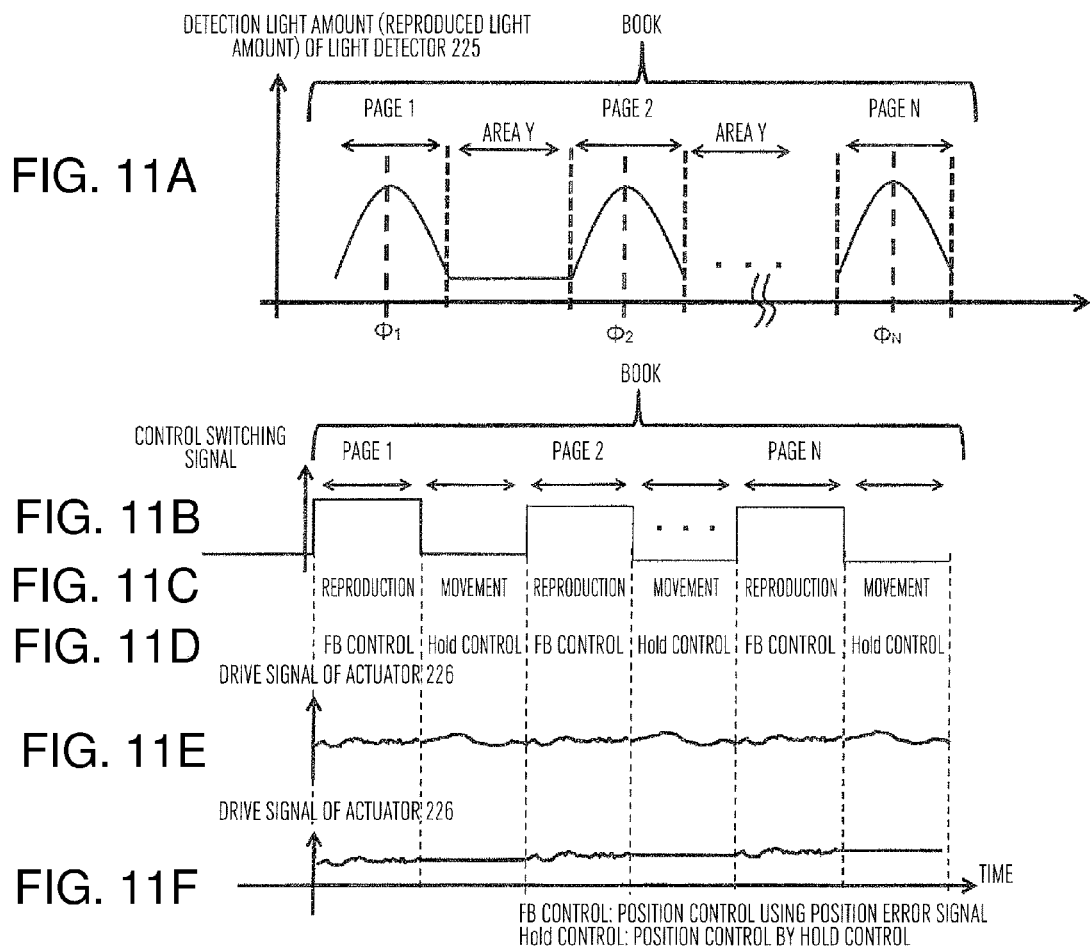

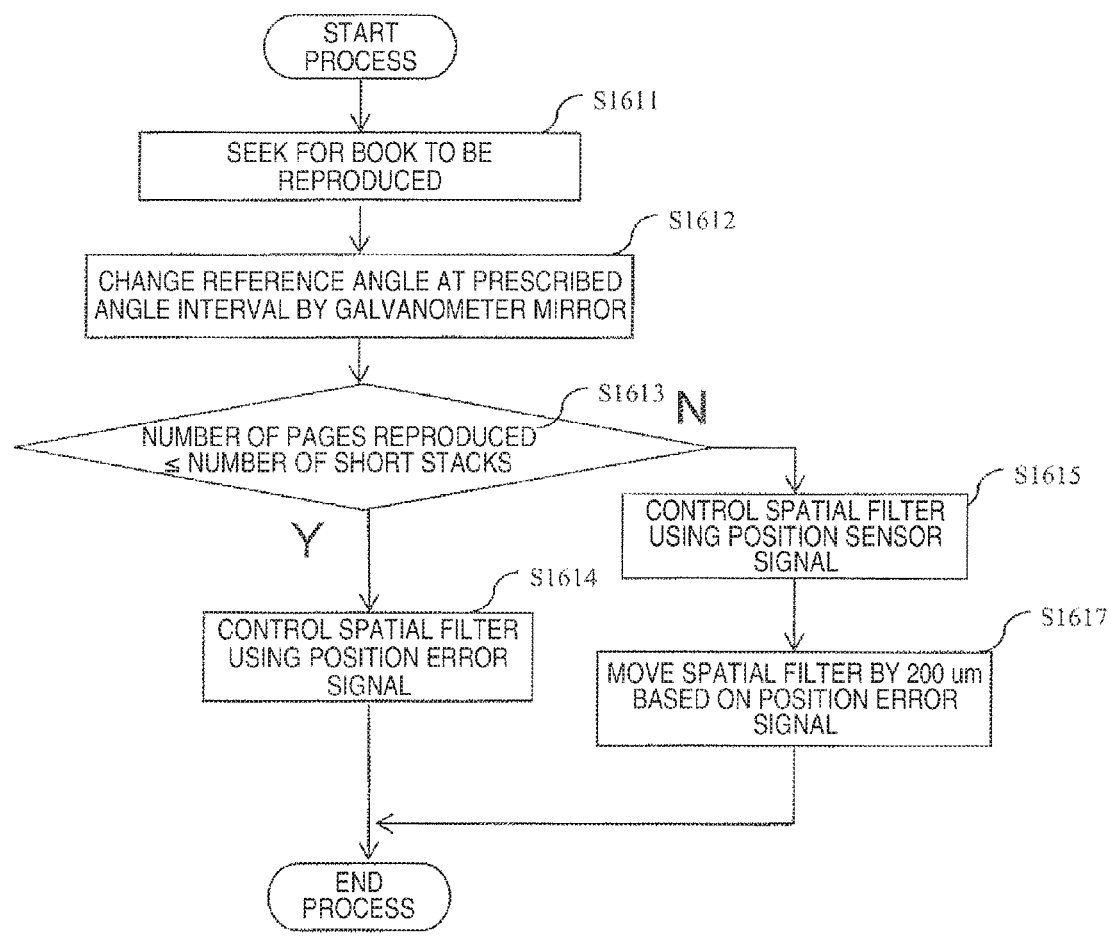

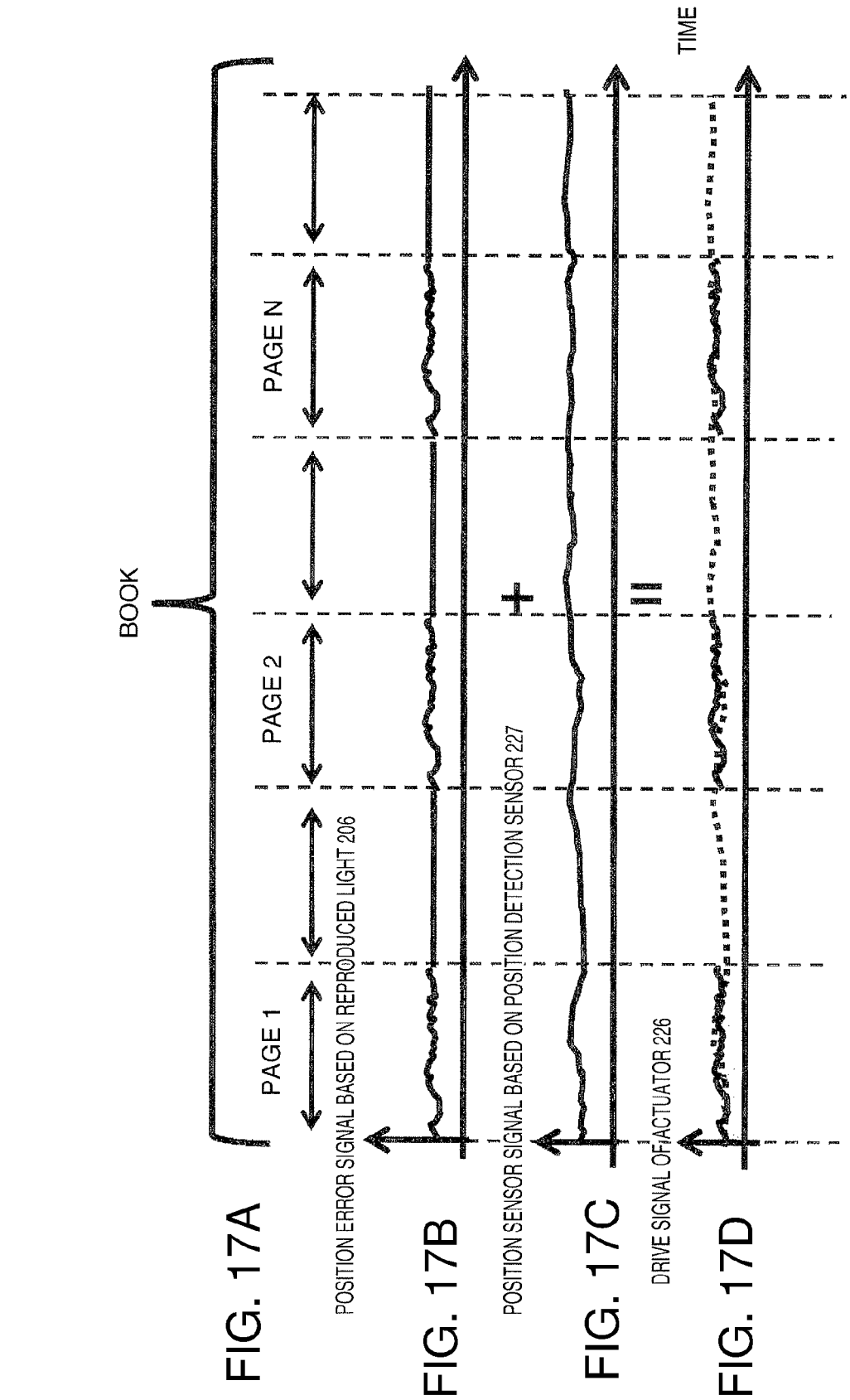

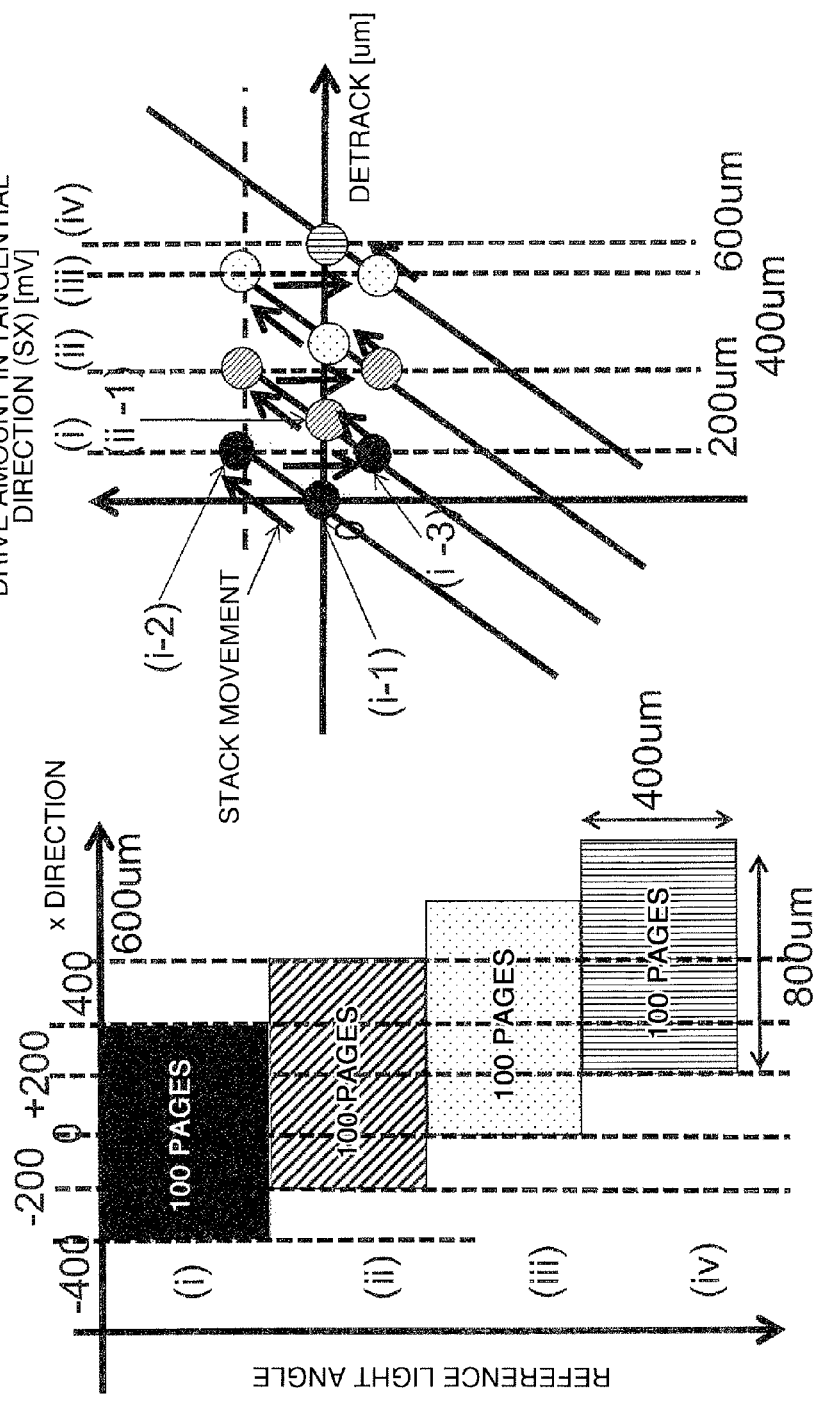

OPTICAL INFORMATION DEVICE AND OPTICAL INFORMATION PROCESSING METHOD

TECHNICAL FIELD

The present invention relates to an optical information device and an optical information processing method that record information on an optical information recording medium and reproduce information from the optical information recording medium, using holography.

BACKGROUND ART

As the related art of a field of present technology, for example, JP 2008-197575 A (Patent Literature 1) is known. In Patent Literature 1, "positions of standard marks M1 to M4 included in image data imaged by an optical sensor 26 are specified and a boundary position of reproduction signal light RS and reproduction reference light RR is specified from the positions. If the boundary position can be specified, a target imaging diameter Dt is calculated on the basis of the boundary position. In addition, an actuator AC1 for iris adjustment is driven by a driver 30c, such that a diameter of an aperture portion AP becomes the target imaging diameter Dt at the time of being imaged by the optical sensor 26." is described. In addition, in Patent Literature 1, "a position of a light shielding plate 20 can be adjusted in a plane orthogonal to an optical axis direction by driving an actuator AC2 for position adjustment and a position of the aperture portion AP can be adjusted in a height direction (Y) and a width direction (X)." is described.

CITATION LIST

Patent Literature

Patent Literature 1: JP 2008-197575 A
Patent Literature 2: U.S. Pat. No. 7,589,877 B2

SUMMARY OF INVENTION

Technical Problem

However, to reproduce information recorded on an optical information recording medium at a high speed in the optical information device using hologram recording technology, it is necessary to determine a reproduction position of the recording medium at a high speed and with accuracy. In Patent Literature 1, "positions of standard marks M1 to M4 included in image data imaged by an optical sensor 26 are specified and a boundary position of reproduction signal light RS and reproduction reference light RR is specified from the positions. If the boundary position can be specified, a target imaging diameter Dt is calculated on the basis of the boundary position. In addition, an actuator AC1 for iris adjustment is driven by a driver 30c, such that a diameter of an aperture portion AP becomes the target imaging diameter Dt at the time of being imaged by the optical sensor 26." is described. However, it is difficult to realize a high speed in continuous reproduction in a drive method using the image data. In addition, accurate positioning is difficult when a position deviation occurs due to a vibration at the time of reproduction.

Accordingly, an object of the present invention is to provide an optical information device and an optical information processing method that enable high-speed and accurate positioning.

Solution to Problem

The above problems can be resolved by controlling a position of an aperture portion, on the basis of a first signal based on reproduced light and a second signal based on a position sensor of the aperture portion, for example.

Advantageous Effects of Invention

According to the present invention, an optical information device and an optical information processing method that enable high-speed and accurate positioning can be provided.

BRIEF DESCRIPTION OF DRAWINGS

FIGS. 4A to 4C are diagrams of an operation flow of the optical information recording/reproducing device according to the first embodiment of the present invention and FIG. 4A illustrates a diagram of an operation flow until a preparation for recording or reproduction is completed after an optical information recording medium is inserted into the optical information recording/reproducing device, FIG. 4B illustrates a diagram of an operation flow until information is recorded on the optical information recording medium from a preparation completion state, and FIG. 4C illustrates a diagram of an operation flow until the information recorded on the optical information recording medium is reproduced from the preparation completion state;

in an optical information recording/reproducing device according to a second embodiment of the present invention, FIG. 11A illustrates a light amount when a hologram formed by reference light angles $\Phi1, \Phi2, \ldots, \Phi N$ to be incident on an optical information recording medium in an optical information recording/reproducing device and signal light is detected by a light detector with the reference light angles displayed in a horizontal axis, FIG. 11B illustrates a reproduced light amount of the hologram at the time of reproduction or a control switching signal generated by a movement of a galvanometer mirror, FIG. 11C illustrates an operation flow at the time of reproduction, showing the reproduction course and the movement course of the galvanometer mirror controlling the reference light angle, FIG. 11D illustrates a flow of control switching of a spatial filter in a pickup for a sequence of FIG. 11E illustrates a drive signal waveform of an actuator positioning the spatial filter when a sensor showing a position is used in the spatial filter in the pickup, and FIG. 11F illustrates an example of a drive signal waveform of the actuator positioning the spatial filter when the sensor showing the position is not used in the spatial filter in the pickup;

in an optical information recording/reproducing device according to a third embodiment of the present invention.

FIG. 13B illustrates an operation flow of switching of position control based on control of the galvanometer mirror with respect to the spatial filter, and FIG. 13C illustrates an operation flow of switching of position control based on a control residual with respect to the spatial filter;

in an optical information recording/reproducing device according to a fourth embodiment of the present invention.

FIG. 16 illustrates an example of an operation flow of a position movement of the spatial filter in the pickup in the optical information recording/reproducing device according to the fourth embodiment of the present invention;

in the optical information recording/reproducing device according to the second and third embodiments of the present invention, FIG. 17A illustrates holograms (pages) formed at reference light angles $\Phi1, \Phi2, \ldots, \Phi N$ to be incident on the optical information recording medium in the optical information recording/reproducing device, FIG. 17B illustrates a position error signal generated by reproduced light of the holograms, FIG. 17C illustrates a position error signal generated by a position detection sensor, and FIG. 17D illustrates an example of positioning the spatial filter in the pickup by generating a drive signal of the actuator using a position error signal obtained by adding FIGS. 17B and 17C;

in an optical information recording/reproducing device according to an embodiment of the present invention, FIG. 18A illustrates a positioning target of a spatial filter in a pickup in the case in which a book is recorded using four short stacks in an optical information recording/reproducing device and FIG. 18B illustrates an example of a profile of control in the case in which the spatial filter in the pickup is positioned on the basis of a position error signal, with respect to the positioning target of FIG. 18A;

DESCRIPTION OF EMBODIMENTS

Figure 1:
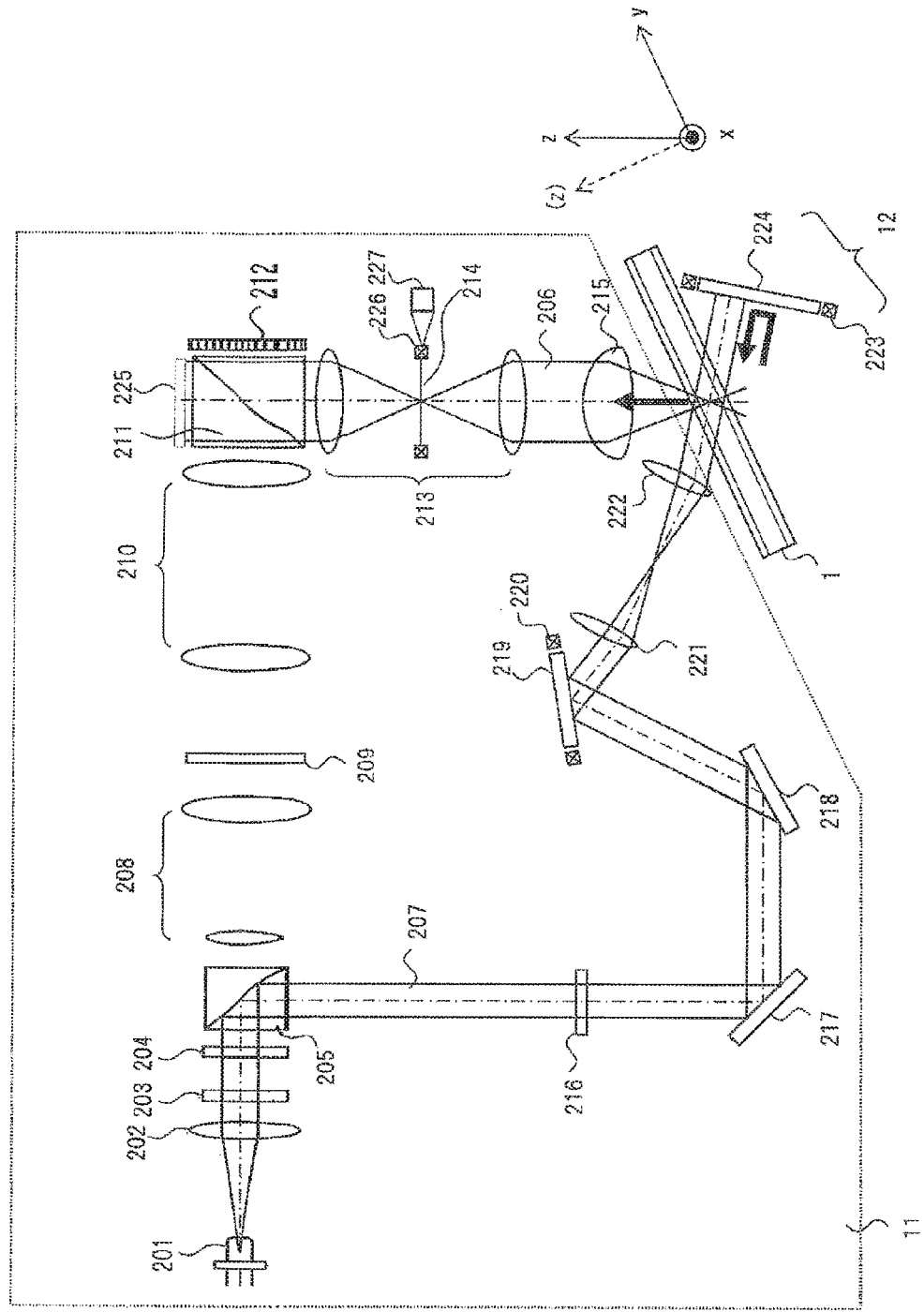
FIG. 1 is a schematic diagram illustrating an example of a configuration of a pickup in an optical information recording/reproducing device according to a first embodiment of the present invention and illustrating a reproduction principle.

Hereinafter, embodiments of the present invention will be described using the drawings.

First Embodiment

A first embodiment of the present invention will be described using FIGS. 1 to 10(c). Like reference numerals refer to like parts throughout the drawings.

Figure 2:
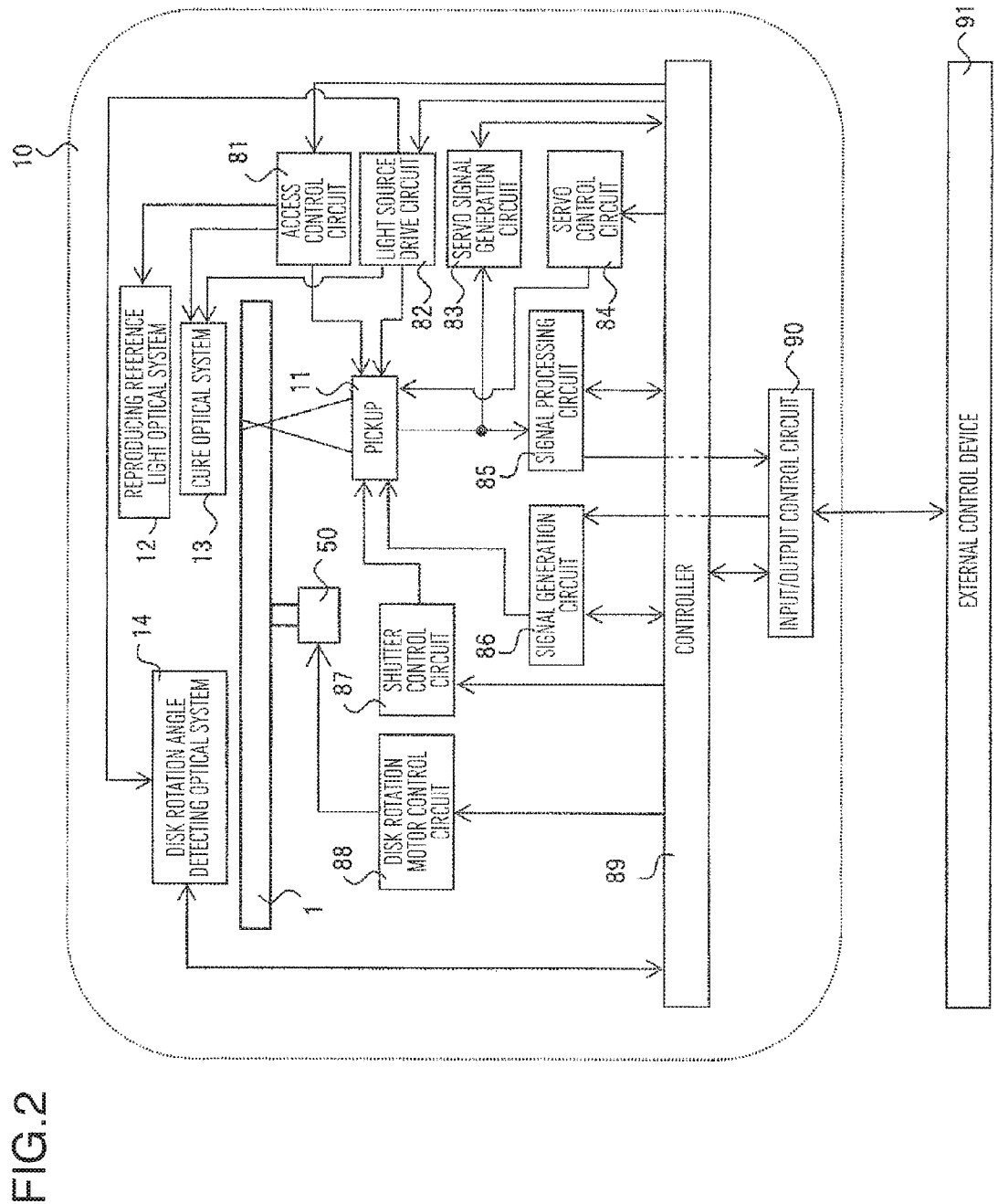
FIG. 2 is a block diagram schematically illustrating an entire configuration of the optical information recording/reproducing device according to the first embodiment of the present invention.

First, an entire configuration of an optical information recording/reproducing device will be described. FIG. 2 is a diagram illustrating an entire configuration of an optical information recording/reproducing device according to this embodiment and a block diagram illustrating a recording/reproducing device of an optical information recording medium recording and/or reproducing digital information using holography.

An optical information recording/reproducing device 10 is connected to an external control device 91 via an input/output control circuit 90. When recording is performed, the optical information recording/reproducing device 10 receives a recorded information signal from the external control device 91 by the input/output control circuit 90. When reproduction is performed, the optical information recording/reproducing device 10 transmits a reproduced information signal to the external control device 91 by the input/output control circuit 90.

The optical information recording/reproducing device 10 includes a pickup 11, a reproducing reference light optical system 12, a cure optical system 13, a disk rotation angle detecting optical system 14, and a rotation motor 50 and an optical information recording medium 1 having a disk shape is configured to be rotatable by the rotation motor 50.

The pickup 11 executes a function of emitting reference light and signal light to the optical information recording medium 1 and recording digital information on the recording medium using the holography. At this time, the recorded information signal is transmitted to a spatial light modulator to be described below in the pickup 11 via a signal generation circuit 86 by a controller 89 and the signal light is modulated by the spatial light modulator. When the information recorded on the optical information recording medium 1 is reproduced, a light wave to cause the reference light emitted from the pickup 11 to be incident on the optical information recording medium in a direction reverse to a direction at the time of recording is generated by the reproducing reference light optical system 12. The reproduced light reproduced by the reproducing reference light is detected by an imaging element to be described below in the pickup 11 and a signal is reproduced by a signal processing circuit 85.

Radiation times of the reference light and the signal light radiated to the optical information recording medium 1 can be adjusted by controlling an opening/closing time of a shutter to be described below in the pickup 11 through a shutter control circuit 87 by the controller 89.

The cure optical system 13 executes a function of generating light beams used for precure and postcure of the optical information recording medium 1. The precure is a preprocess for radiating a prescribed light beam in advance before radiating the reference light and the signal light to a desired position, when information is recorded on the desired position in the optical information recording medium 1. The postcure is a post-process for radiating a prescribed light beam to disable additional recording on the desired position, after the information is recorded on the desired position in the optical information recording medium 1.

The disk rotation angle detecting optical system 14 is used to detect a rotation angle of the optical information recording medium 1. When a rotation angle of the optical information recording medium 1 is adjusted to a prescribed rotation angle, a signal according to the rotation angle can be detected by the disk rotation angle detecting optical system 14 and the rotation angle of the optical information recording medium 1 can be controlled through a disk rotation motor control circuit 88 by the controller 89, using the detected signal.

In addition, in the pickup 11 and the cure optical system 13, mechanisms for enabling sliding in a radial direction of the optical information recording medium 1 are provided and position control is executed by an access control circuit 81. Alternatively, in the optical information recording/reproducing device 10, a mechanism for sliding the optical information recording medium 1 in the radial direction is provided and position control is executed by the access control circuit 81.

A prescribed light source drive current is supplied from a light source drive circuit 82 to light sources in the pickup 11, the cure optical system 13, and the disk rotation angle detecting optical system 14 and a light beam having a prescribed light amount is emitted from each light source.

In recording technology using an angle multiplexing principle of the holography, an allowable error for a deviation of a reference light angle tends to decrease extremely.

Therefore, a mechanism for detecting a deviation amount of the reference light angle is provided in the pickup 11 and a servo mechanism for generating a signal for servo control by a servo signal generation circuit 83 and correcting the deviation amount by a servo control circuit 84 is provided in the optical information recording/reproducing device 10.

In addition, the pickup 11, the cure optical system 13, and the disk rotation angle detecting optical system 14 may be simplified by integrating some optical system configurations or all optical system configurations as one optical system configuration.

Figure 3:
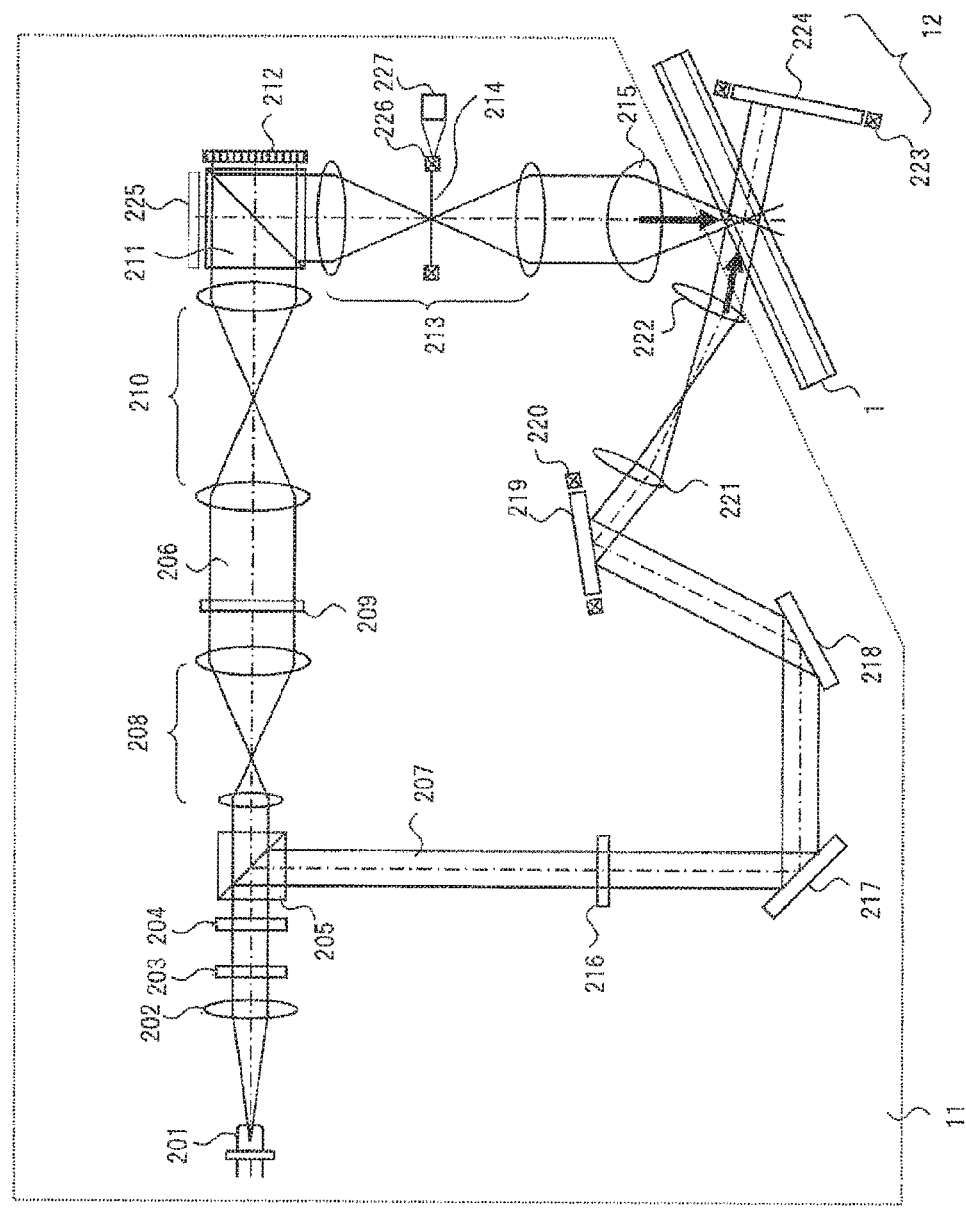
FIG. 3 is a schematic diagram illustrating a pickup having the same configuration as the configuration of FIG. 1 and illustrating a recording principle.

Next, a configuration of the pickup will be described. FIG. 3 is a schematic diagram illustrating an example of a basic optical system configuration of the pickup 11 in the optical information recording/reproducing device 10 according to this embodiment and a recording principle is described using this drawing. A light beam emitted from a light source 201 transmits a collimating lens 202 and is incident on a shutter 203. When the shutter 203 is opened, after the light beam passes through the shutter 203, a polarization direction of the light beam is controlled such that a light amount ratio of P polarized light and S polarized light becomes a desired ratio by an optical element 204 composed of a ½ wavelength plate, for example, according to a recording operation or a reproduction operation. Then, the light beam is incident on a polarization beam splitter 205. In this embodiment, it is assumed that the light beam is converted into the P polarized light and the S polarized light when recording is performed and the light beam is converted into the S polarized light when reproduction is performed.

The light beam having transmitted the polarization beam splitter 205 functions as signal light 206 and a beam diameter thereof is expanded to a desired beam diameter by a beam expander 208. Then, the light beam transmits a phase mask 209, a relay lens 210, and a polarization beam splitter 211 and is incident on a spatial light modulator 212. The spatial light modulator s an optical element that adds an information signal such as two-dimensional image data to the signal light. For example, minute elements executing polarization conversion (P polarized light→S polarized light) are arranged two-dimensionally and each element is driven according to the recorded information signal.

The signal light to which information has been added by the spatial light modulator 212 is reflected on the polarization beam splitter 211 and propagates through a relay lens 213 and a spatial filter 214 in which a position can be adjusted by an actuator 226. Then, the signal light is condensed on the optical information recording medium 1 by an objective lens 215. Here, when a hologram is recorded on the optical recording medium 1, the actuator 226 is driven according to an output of a position detection sensor 227 to control a position (for example, a position on an x-z plane) of the spatial filter 214 within a constant range (for example, target position±1 um or less).

Meanwhile, the light beam having reflected on the polarization beam splitter 205 functions as reference light 207 and a polarization direction thereof is set to a prescribed polarization direction according to a recording mode or a reproduction mode, by a polarization direction conversion element 216. In this embodiment, it is assumed that the light beam is converted into S polarized light at the time of recording and the light beam is converted into P polarized light at the time of reproduction. Then, the reference light is incident on a galvanometer mirror 219 via mirrors 217 and 218. Because the galvanometer mirror 219 can adjust an angle by an actuator 220, the galvanometer Mirror 219 can set an incidence angle of the reference light incident on the optical information recording medium 1 after passing through the lenses 221 and 222 to a desired angle. Instead of the galvanometer mirror, an element to convert a wave front of the reference light may be used to set the incidence angle of the reference light.

As such, the signal light and the reference light are overlapped and incident on the optical information recording medium 1 to form an interference fringe pattern in the recording medium and the pattern is written to the recording medium to record information. In addition, because the incidence angle of the reference light incident on the optical information recording medium 1 can be changed by the galvanometer mirror 219, recording by angle multiplexing is enabled.

Hereinafter, in holograms where information is recorded on the same area while the reference light angle is changed, a hologram corresponding to each reference light angle is called a "page" and a collection of pages where an angle is multiplexed to the same area is called a "book".

After information (page) is recorded on the optical information recording medium 1, the shutter 203 is closed and subsequently recorded information is displayed by the spatial light modulator 212. At the same time, the galvanometer mirror 219 is rotated by a minute amount (for example, 0.1 degrees) and the incidence angle of the reference light on the optical information recording medium 1 is changed. Then, if the shutter 203 is opened, the subsequently recorded information is multiple-recorded as a new page of the same book of the optical information recording medium 1 at an angle different from an angle of a previously recorded page. If a page number reaches a prescribed multiplex number (for example, 200 pages), a movement to a next book is performed. In the movement of the book, the optical information recording medium 1 is moved by a drive unit not illustrated in the drawings with respect to a position of the objective lens 215. Reference numerals 223 and 226 show actuators, a reference numeral 224 shows a galvanometer mirror, and a reference numeral 225 shows an imaging element.

FIG. 1 is a schematic diagram illustrating a pickup having the same configuration as the configuration of FIG. 3 and illustrating a reproduction principle. When recorded information is reproduced, the reference light 207 is incident on the optical information recording medium 1 as described above. In addition, the reference light having transmitted the optical information recording medium 1 is incident substantially vertically to the galvanometer mirror 224 where an angle can be adjusted by the actuator 223 and is reflected in an opposite direction, so that the reference light becomes phase conjugate light, and the reference light is incident as the reproducing reference light on the optical information recording medium 1 again. In addition, the actuator 223 and the galvanometer mirror configure the reproducing reference light optical system 12.

The reproduced light 206 reproduced by the reproducing reference light propagates through the objective lens 215, the relay lens 213, and the spatial filter 214 where the position can be adjusted by the actuator 226. Then, the reproduced light 206 transmits the polarization beam splitter 211 and is incident on the imaging element 225 and a recorded signal can be reproduced. An imaging element such as a CMOS image sensor and a CCD image sensor can be used as the imaging element 225. However, any element that can reproduce page data may be used.

Next, a recording/reproducing operation flow will be described. FIGS. 4(a) to 4(c) illustrate recording and reproduction operation flows in the optical information recording/reproducing device 10 according to this embodiment. Here, flows for recording and reproduction using the holography in particular will be described.

FIG. 4(a) illustrates an operation flow until a preparation for recording or reproduction is completed after the optical information recording medium 1 is inserted into optical information recording/reproducing device 10, FIG. 4(b) illustrates an operation flow until information is recorded on the optical information recording medium 1 from a preparation completion state, and FIG. 4(c) illustrates an operation flow until the information recorded on the optical information recording medium 1 is reproduced from the preparation completion state.

As illustrated in FIG. 4(a), if the optical information recording medium is inserted (S401), the optical information recording/reproducing device 10 performs optical information recording medium determination on whether the inserted optical information recording medium is an optical information recording medium recording or reproducing digital information using the holography (S402).

As a result of the optical information recording medium determination, when it is determined that the inserted optical information recording medium is the optical information recording medium recording or reproducing the digital information using the holography, the optical information recording/reproducing device 10 reads control data installed in the optical information recording medium (S403). For example, the optical information recording/reproducing device 10 acquires information regarding the optical information recording medium or information regarding various setting conditions at the time of recording or reproduction. In the case of an optical information recording/reproducing device exclusively used for the holography, the determination step (S402) may be omitted.

After the control data is read, various adjustments according to the control data or a learning process (S404) for the pickup 11 is executed and the optical information recording/reproducing device 10 completes the preparation for the recording or the reproduction (S405).

In the operation flow until the information is recorded from the preparation completion state, as illustrated in FIG. 4(b), first, the recorded data is received (S411) and information according to the data is transmitted to the spatial light modulator in the pickup 11

Then, various recording learning processes such as power optimization of the light source 201, optimization of an exposure time by the shutter 203, and positioning of the spatial filter 214 by driving of the actuator 226 by the servo control circuit 84 according to an output of the position detection sensor 227 are previously executed according to necessity (S412), such that high-quality information can be recorded on the optical information recording medium Then, in a seek operation (S413), the access control circuit 81 is controlled and positions of the pickup 11 and the cure optical system 13 are adjusted to a prescribed position of the optical information recording medium. When the optical information recording medium 1 has address information, the address information is reproduced and it is confirmed whether a target material is arranged at a target position. When the target material is not arranged at the target position, a deviation amount with the prescribed position is calculated and a positioning operation is repeated.

Then, the precure is executed on a prescribed area using the light beam emitted from the cure optical system 13 (S414) and data is recorded using the reference light and the signal light emitted from the pickup 11 (S415).

After the data is recorded, the postcure is executed using the light beam emitted from the cure optical system 13 (S416). According to necessity, the data may be verified.

In the operation flow until the recorded information is reproduced from the preparation completion state, as illustrated in FIG. 4(*c*), first, in a seek operation (S421), the access control circuit 81 is controlled and positions of the pickup 11 and the reproducing reference light optical system 12 are adjusted to a prescribed position of the optical information recording medium. When the optical information recording medium 1 has address information, the address information is reproduced and it is confirmed whether a target material is arranged at a target position. When the target material is not arranged at the target position, a deviation amount with the prescribed position is calculated and a positioning operation is repeated.

Then, the reference light is emitted from the pickup 11, the information recorded on the optical information recording medium is read (S422), and reproduction data is transmitted (S423).

Figure 5A:
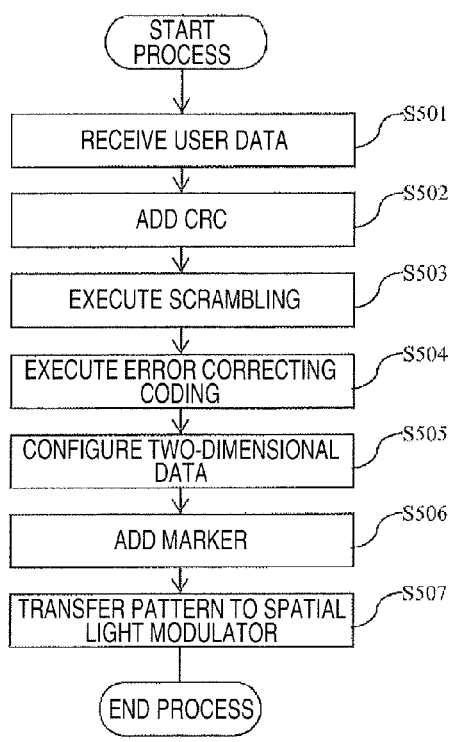
FIGS. 5A and 5B are diagrams of a data processing flow at the time of recording and reproduction in the optical information recording/reproducing device according to the first embodiment of the present invention and FIG. 5A illustrates a diagram of an operation flow of a signal generation circuit and FIG. 5B illustrates a diagram of an operation flow of a signal processing circuit.
Figure 5B:
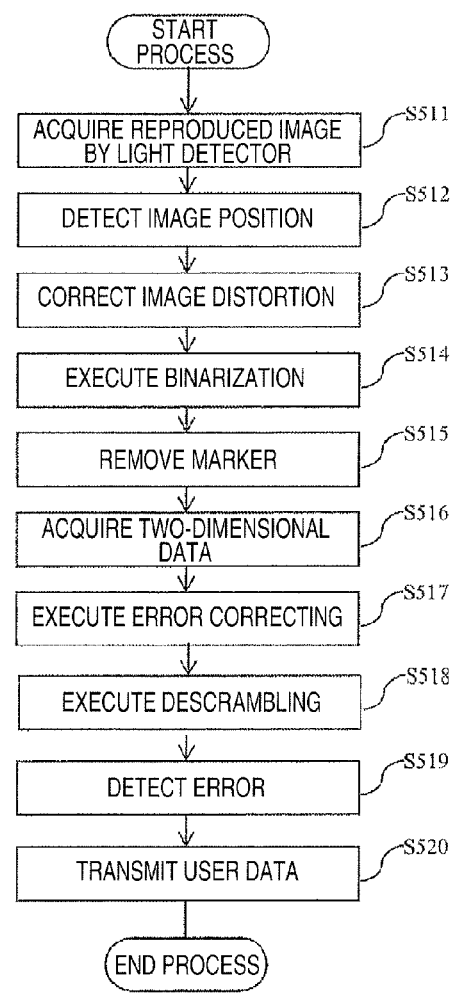

Next, a recording/reproducing operation data process flow will be described. FIGS. 5(*a*) and 5(*b*) illustrate diagrams of a data process flow at the time of recording and reproduction in the optical information recording/reproducing device according to this embodiment. FIG. 5(*a*) illustrates a recording data process flow in the signal generation circuit 86 until recording (user) data is converted into two-dimensional data on the spatial light modulator 212 after recording (user) data reception S411 in the input/output control circuit 90. FIG. 5(*b*) illustrates a reproduction data process flow in the signal processing circuit 85 until reproduction data transmission (corresponding to S423 of FIG. 4(*c*)) in the input/output control circuit 90, after the two-dimensional data (reproduction image) is detected by the imaging element (light detector) 225.

A data process at the time of recording will be described using FIG. 5(*a*). If the user data is received (S501), the data is divided into a plurality of data strings, a cyclic redundancy check (CRC) is executed on each data string such that an error is detected at the time of reproduction (S502), and scrambling (S503) to add a pseudo random number data string to the data string for the purpose of setting an on pixel number and an off pixel number to be almost equal to each other and preventing the same pattern from being repeated is executed, and error correcting coding (S504) such as Reed-Solomon coding is executed such that the error is corrected at the time of reproduction. Next, the data string is converted into two-dimensional data of M×N, this is repeated by data of one page, and two-dimensional data (S505) corresponding to one page is configured. A marker becoming a standard in image position detection or image distortion correction at the time of reproduction is added to the two-dimensional data configured as described above (S506) and data is transferred to the spatial light modulator 212 (S507).

Next, a data process flow at the time of reproduction will be described using FIG. 5(*b*). The image data (reproduction image data) detected by the imaging element (light detector) 225 is transferred to the signal processing circuit 85 (S511). An image position is detected on the basis of the marker included in the image data (S512) and an inclination, a magnification, and a distortion of an image are corrected (S513). Then, a binarization process (S514) is executed, the marker is removed (S515), and two-dimensional data corresponding to one page is acquired (S516). After the two-dimensional data obtained as described above is converted into a plurality of data strings, an error correcting process (S517) is executed and a parity data string is removed. Next, a descrambling process (S518) is executed, an error detection process (S519) by the CRC is executed to erase a CRC parity, and the user data is transmitted via the input/output control circuit 90 (S520).

Figure 6:
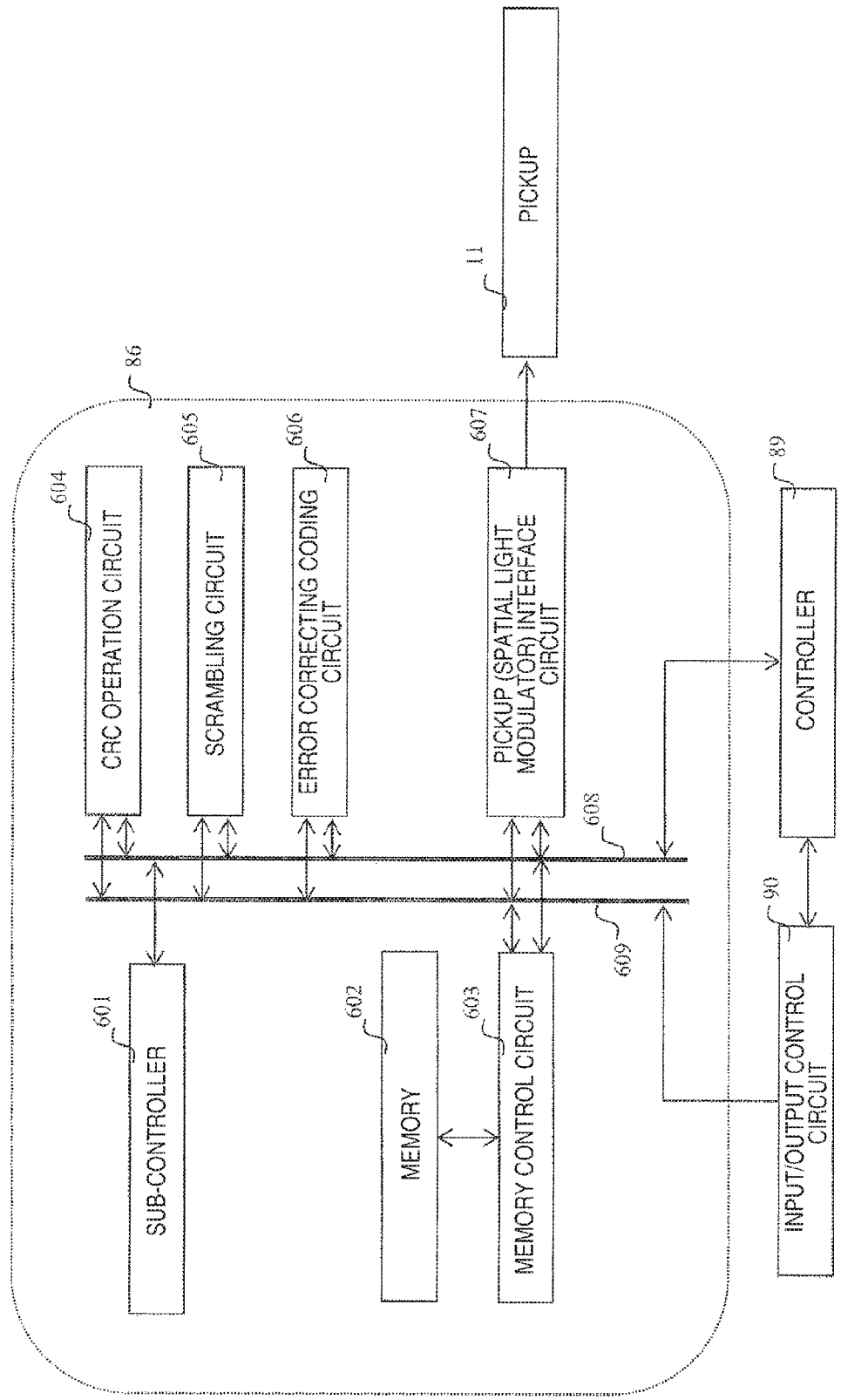
FIG. 6 is a block diagram illustrating an example of a configuration of the signal generation circuit in the optical information recording/reproducing device according to the first embodiment of the present invention.
Figure 7:
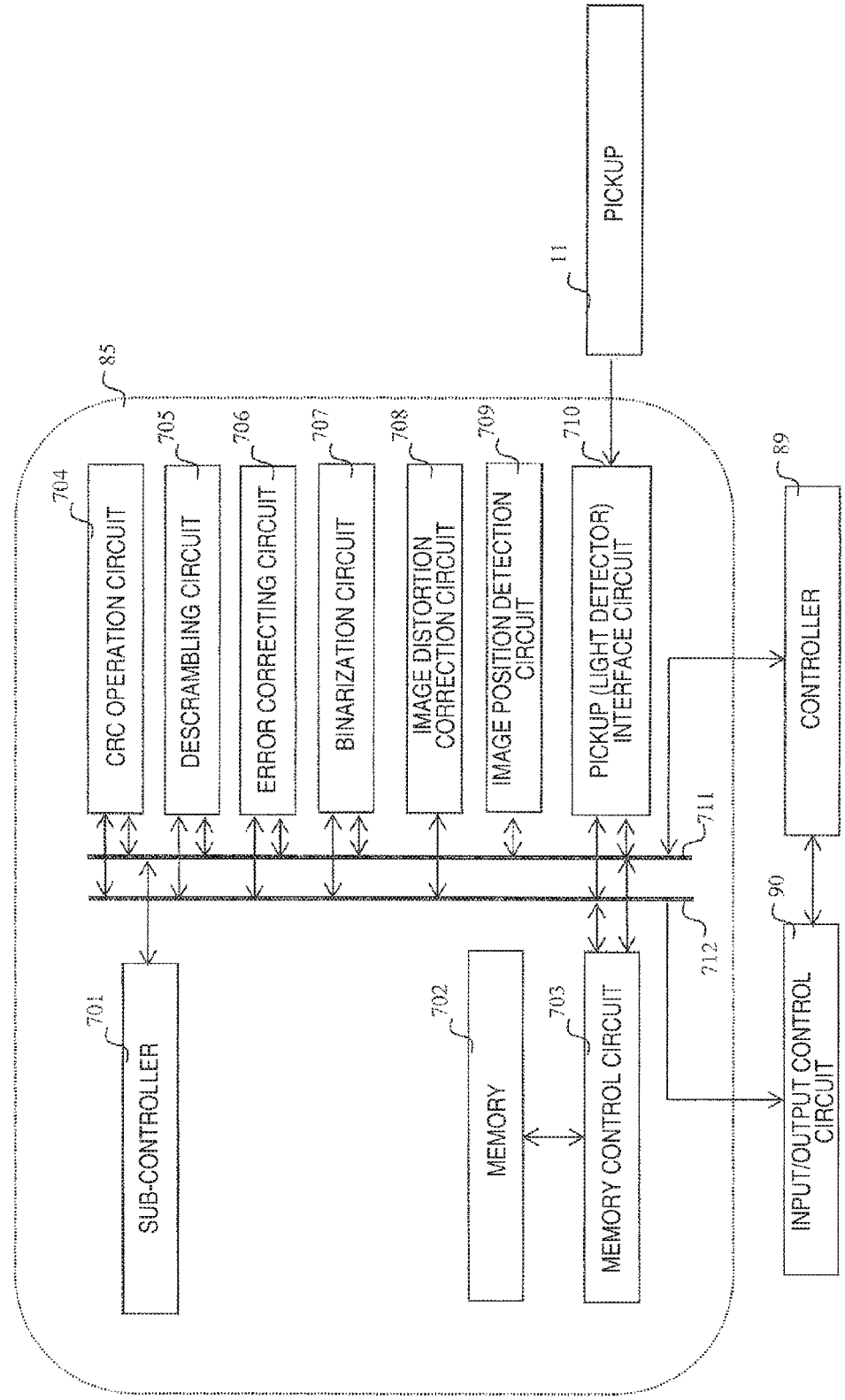
FIG. 7 is a block diagram illustrating an example of a configuration of the signal processing circuit in the optical information recording/reproducing device according to the first embodiment of the present invention.

Next, the signal generation circuit will be described. FIG. 6 is a block diagram of the signal generation circuit 86 of the optical information recording/reproducing device 10 according to this embodiment. If an input of the user data to the input/output control circuit 90 starts, the input/output control circuit 90 notifies the controller 89 that the input of the user data has started. The controller 89 receives the notification and commands the signal generation circuit 86 to record and process data input from the input/output control circuit 90 and corresponding to one page. A process command from the controller 89 is notified to a sub-controller 601 in the signal generation circuit 86 via a control line 608. The sub-controller 601 receives the notification and controls each signal processing circuit via a control line 608, such that each signal processing circuit is operated in parallel. First, control is executed such that a memory control circuit 603 stores the user data input from the input/output control circuit 90 via the data line 609 in a memory 602. If an amount of user data stored in the memory 602 reaches a constant amount, control is executed such that a CRC operation circuit 604 executes the CRC on the user data. Next, control is executed such that scrambling to add the pseudo random number data string to the data on which the CRC has been executed is executed by a scrambling circuit 605 and error correcting coding to add the parity data string is executed by an error correcting coding circuit 606. Finally, a pickup interface circuit 607 is caused to read the data on which the error correcting coding has been executed from the memory 602 in arrangement order of the two-dimensional data on the spatial light modulator 212 and the marker becoming the standard at the time of reproduction is added. Then, the two-dimensional data is transferred to the spatial light modulator 212 in the pickup 11, Next, the signal processing circuit will be described. FIG. 7 is a block diagram of the signal processing circuit 85 in the optical information recording/reproducing device 10 according to this embodiment. If the imaging element 225 in the pickup 11 detects the image data, the controller 89 commands the signal processing circuit 85 to reproduce and process data input from the pickup 11 and corresponding to one page. A process command from the controller 89 is notified to a sub-controller 801 in the signal processing circuit 85 via a control line 711. The sub-controller 701 receives the notification and controls each signal processing circuit via the control line 711, such that each signal processing circuit is operated in parallel. First, control is executed such that a memory control circuit 703 stores image data input from the pickup 11 via a pickup interface circuit 710 in a memory 702 via a data line 712. If an amount of image data stored in the memory 702 reaches a constant amount, control is executed such that an image position detection circuit 709 detects a marker from the image data stored in the memory 702 and extracts a valid data range. Next, control is executed such that an image distortion correction circuit 708 corrects an inclination, a magnification, and a distortion of an image using the detected marker and converts a size of the image data into a size of expected two-dimensional data. Control is executed such that binarization to determine each bit data of a plurality of bits configuring the size converted two-dimensional data as "0" or "1" is executed in a binarization circuit 707 and data is stored in the memory 702 in output order of the reproduction data. Next, an error included in each data string is corrected by an error correcting circuit 706, scrambling to add a pseudo random number data string is released by a descrambling circuit 705, and a check is executed by a CRC operation circuit 704 such that an error is not included in the user data on the memory 702. Then, the user data is transferred from the memory 702 to the input/output control circuit 90.

Next, a configuration of the spatial filter 214 to detect a position error signal will be described. A method of detecting the position error signal of the recording medium in this embodiment will be described in detail using FIGS. 8(a) to 9(b). Here, a position error is a deviation of a relative position of a position (position where there is a hologram to be reproduced) of information in the optical information recording medium 1 to be reproduced and an optical system (for example, the objective lens 215). Hereinafter, a recording/reproducing direction (circumferential direction in the case of a disk) of a book on the optical information recording medium 1 is set as an x direction, a direction (radial direction vertical to the x direction in a plane of the optical information recording medium 1 is set as y direction, and an optical axis direction (focus direction) of the objective lens 215 or a vertical direction of the optical information recording medium 1 is net as ox direction, as illustrated in FIG. 1, and position error signals for the individual directions are set as SX, SY, and SZ.

Figure 8B:
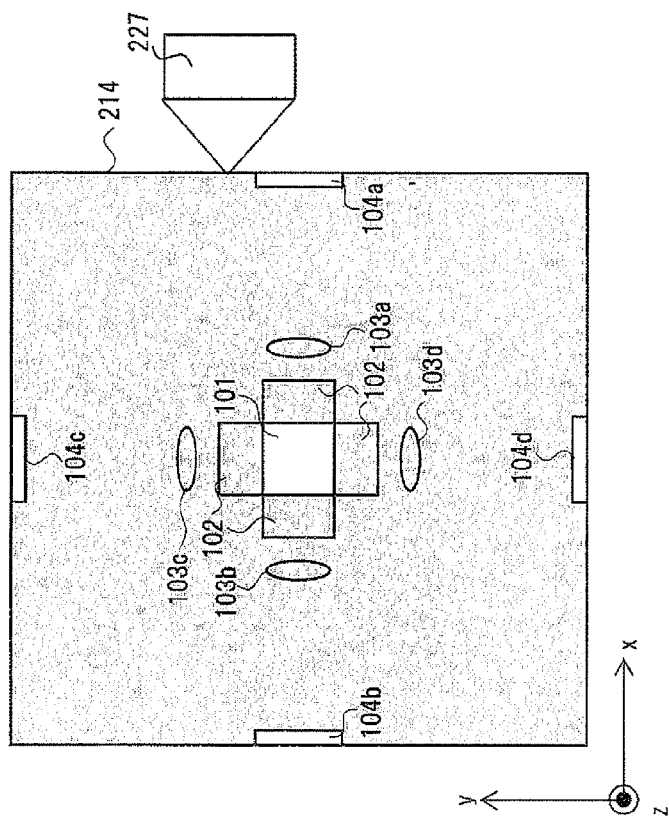
FIGS. 8A and 8B are schematic diagrams of a spatial filter in the pickup in the optical information recording/reproducing device according to the first embodiment of the present invention and FIG. 8A illustrates a cross-sectional view taken along an x direction line passing a center of an aperture portion 101 and FIG. 8B illustrates a plan view when viewed from the side of an optical information recording medium 1.
Figure 8A:
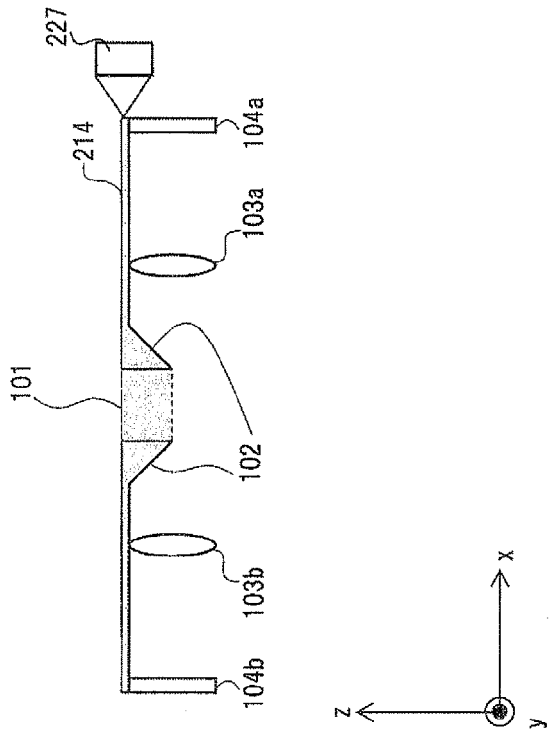

FIGS. 8(a) and 8(b) are configuration diagrams illustrating an example of the spatial filter 214 in the pickup 11 in the optical information recording/reproducing device according to this embodiment. FIG. 8(a) is a cross-sectional view taken along an x direction line passing a center of an aperture portion 101 of the spatial filter 214 and FIG. 8(b) is a plan view of the spatial filter 314 when viewed from the side of the optical information recording medium 1. The spatial filter 214 has a configuration in which the aperture portion 101 is provided in a center thereof and a reflection portion 102 is provided in a peripheral portion thereof. In addition, lenses 103a, 103b, 103c, and 103d and light detectors 104a, 104b, 104c, and 104d are provided on an optical path of reflection light by the reflection portion 102. In addition, a position detection sensor 227 to detect a position of the spatial filter 214 at the time of recording or reproduction is provided. As illustrated in FIG. 1, the reproduced 206 reproduced by the reproducing reference light 206 transmits the objective lens 215 as described above and is condensed to the aperture portion 101 of the spatial filter 214 from the lower side of FIG. 8(a) by the relay lens 213.

Figure 9A:
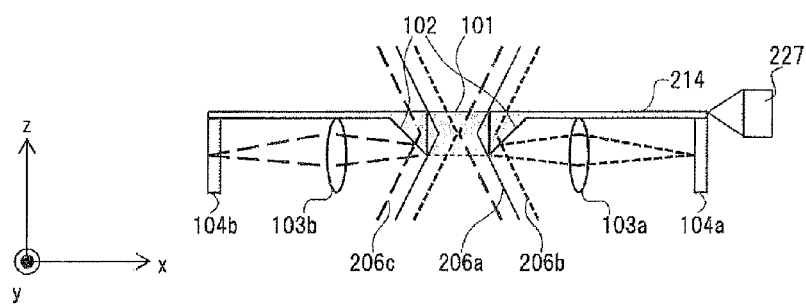
FIGS. 9A and 9B are ray views of reproduced light in the vicinity of the spatial filter in the pickup in the optical information recording/reproducing device according to the first embodiment of the present invention and FIG. 9A illustrates the case in which there is a position error of an x direction (or a position error of a y direction) and FIG. 9B illustrates the case in which there is a position error of a z direction.
Figure 9B:
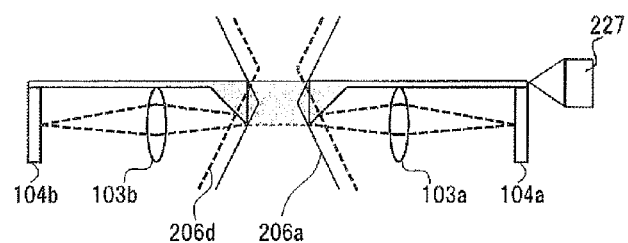

FIGS. 9(a) and 9(b) are ray views of the reproduced light 206 in the vicinity of the spatial filter 214 in the pickup in the optical information recording/reproducing device according to this embodiment. FIG. 9(a) illustrates a ray view when there is a position error of the x direction (this is applicable to the y direction) and FIG. 9(b) illustrates a ray view when there is a position error of the z direction. The aperture portion 101 passes reproduced light 206a when there is no position error. Meanwhile, when there is the position error, for example, there is a deviation in a positive direction of an x axis (206b), the reproduced light is reflected by the reflection portion 102, passes through the lens 103a, and is detected by the light detector 104a. When there is a deviation in a negative direction of the x axis (206c), the reproduced light is reflected by the reflection portion 102, passes through the lens 103b, and is detected by the light detector 104b. Likewise, in the case of a deviation of the y direction, the reproduced light passes through the lens 103c(d) and is detected by the light detector 104c(d). In addition, when there is a deviation in the z direction (206d), the reproduced light is reflected by the reflection portion 102, passes through the lenses 103a, 103b, 103c, and 103d, and is detected by the light detectors 104a, 104b, 104c, and 104d. As such, when there is a position error for the objective lens 215 in the information (hologram) in the optical information recording medium 1 to be reproduced, reflection light of the reproduced light 206 in the reflection portion 102 of the spatial filter 214 is detected by the light detectors 104a, 104b, 104c, and 104d.

Here, signals obtained from the light detectors 104a, 104b, 104c, and 104d are set as A, B, C, and D, respectively. The position error signals SX, SY, and SZ are obtained by the following Mathematical Formulas, respectively.

$$SX = A - B \quad \text{(MATH. 1)}$$

$$SY = C - D \quad \text{(MATH. 2)}$$

$$SZ = A + B \pm C + D \quad \text{(MATH. 3)}$$

Figure 10A:
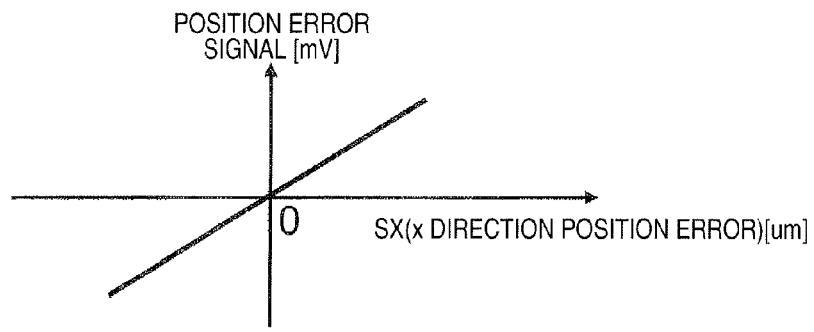
FIGS. 10A to 10C illustrate an example of a position error signal in the case in which the spatial filter in the pickup in the optical information recording/reproducing device according to the first embodiment of the present invention has a position error in the x direction in FIG. 10A, a position error in the y direction in FIG. 10B, and a position error signal in the z direction in FIG. 10C.
Figure 10B:
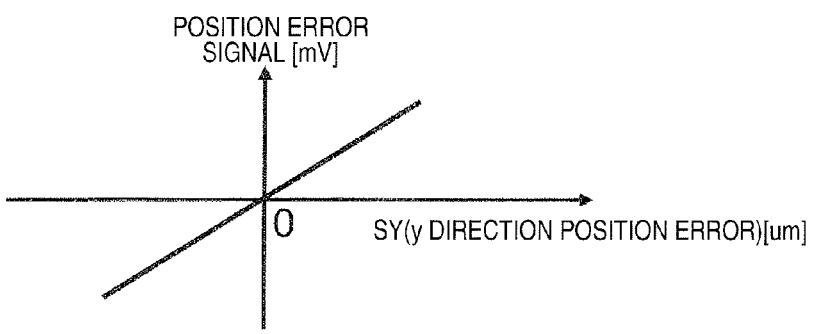
Figure 10C:
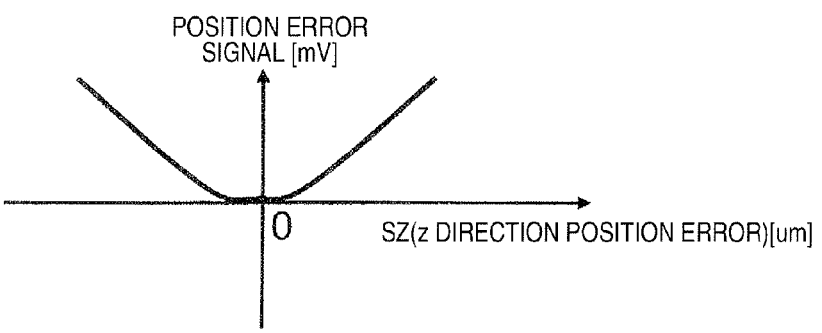

Operations of the position error signals are executed by the servo signal generation circuit 83 of the optical information recording/reproducing device and calculation results thereof become a position error signal showing a position error of the x direction (circumferential direction) in FIG. 10(a), a position error signal showing a position error of the y direction (radial direction) in FIG. 10(b), and a position error signal showing a position error of the z direction locus direction) in FIG. 10(c), respectively. The actuator 226 is driven by the servo control circuit 84 such that the calculated position error signals become 0, so that the spatial filter 214 is positioned. In the present invention, a method of acquiring the position error signals is not limited to FIGS. 8(a) to 9(b) and other configuration may be used. For example, the position error signal may be acquired by changing polarization of only a portion passing a divided wavelength plate and causing the position error in the reproduced light 206 incident on the spatial filter 214 and causing the reproduced light to be incident on a polarization beam splitter (PBS) and other method may be used. In addition, it is not necessary to acquire position error signals of all directions.

Meanwhile, in the case in which the reproduced light 206 is not sufficiently obtained, for example, during a movement between pages (for example, an area Y of FIGS. 11(a) to 11(f) to be described below) or a movement between books (for example, during a movement of the pickup or the optical information recording medium at the time of a seek process), the actuator 226 is driven by the servo control circuit 84 according to an output of the position detection sensor 227, so that a position of the spatial filter 214 is controlled within a constant range (for example, a target position ±1 um, in this embodiment, a target position is set to 0 um where a position error is minimized).

Here, in the case in which the reproduced light is not sufficiently obtained, if the spatial filter may be controlled on the basis of the position error signal by the reproduced light, the spatial filter may be positioned at a page or book different from a desired page or book to be reproduced. In this case, a retry process becomes necessary and high-speed positioning may be disabled. Meanwhile, in the case in which the reproduced light 206 is not sufficiently obtained, for example, during the movement between the pages or the movement between the books, the spatial filter is controlled on the basis of a position detection sensor signal, so that the above situation can be avoided, and high-speed positioning is enabled. In addition, the process can proceed to control based on a next position error signal smoothly. The position detection sensor 227 in this embodiment can be realized by a position sensitive detector (PSD), for example. However, any sensor or element that can detect a position of the spatial filter may be used. This is applicable to the following embodiments.

According to this embodiment described above, the spatial filter is controlled on the basis of the position error signal and the position detection sensor signal, so that high-speed and accurate positioning is enabled.

Even when the hologram recording technology is used, accurate positioning is enabled without providing a new servo information area in the recording medium.

Second Embodiment

A second embodiment of the present invention will be described using FIGS. 11(*a*) to 11(*f*). Content that is described in the first embodiment and is not described in this embodiment is applicable to this embodiment, as long as there are not special circumstances. In this embodiment, a different example of the case in which a position of a spatial filter 214 is controlled will be described. An entire configuration and an operation flow of an optical information recording/reproducing device are the same as those in the first embodiment and description thereof is omitted in this embodiment.

FIG. 11 is a schematic diagram of control of a spatial filter in a pickup in the optical information recording/reproducing device according to this embodiment. As described in the recording course of the hologram illustrated in FIG. 3 corresponding to the first embodiment, a page is recorded while an incidence angle of reference light incident on an optical information recording medium 1 is rotated by a minute amount (for example, 0.1 degrees) by a galvanometer mirror 219. For this reason, if reproducing reference light is radiated to the optical information recording medium 1 on which a plurality of books are recorded, reproduced light 206 is obtained from a certain reference light angle (for example, Φ1, Φ2, . . . , ΦN; where N is a natural number), as illustrated in FIG. 11(*a*). A position error signal is generated by a servo signal generation circuit 83 of the optical information recording/reproducing device using a signal not passing through an aperture portion 101 of the spatial filter 214 in the reproduced light 206. In an area Y where a page is not recorded, because there is no page, a position error signal is not generated. Therefore, according to two courses of a reproduction course (described as reproduction in the drawing) at the certain reference light angle (for example, Φ1) and a movement course (described as a movement in the drawing) of the galvanometer mirror 219 controlling the reference light angle as illustrated in FIG. 11(*c*), by a control switching signal of FIG. 11(*b*), as described in FIG. 11(*d*), when the position error signal is obtained from the reproduced light 206, an actuator 226 is driven by a servo control circuit 84 using the position error signal (described as FB control in FIG. 11(*d*)) and when an operation of the position error signal is disabled by the reproduced light 206 from a hologram, for example, during a movement between pages or a movement between books, the actuator 226 is driven by the servo control circuit 84 according to an output of a position detection sensor 227 (described as Hold control in FIG. 11(*d*)), so that a position of the spatial filter 214 is controlled within a constant range (for example, a target position±1 um, in this embodiment, a target position is set to 0 um where a position error is minimized).

Here, the position of the spatial filter 214 is detected using the position detection sensor 227, so that a drive signal of the actuator 226 can realize position control in both the reproduction course and the movement course, as illustrated in FIG. 11(*e*). However, if the position is not detected using the position detection sensor 227, as illustrated in FIG. 11(*f*), in the movement course, the position control can be realized by simple Hold control (for example, in the case of voltage drive, a voltage of the drive signal of the actuator 226 is held at a constant value) or feed forward control. In the case in which the position of the spatial filter 214 is controlled using the position detection sensor 227, it is easy to maintain fixed control with respect to disturbance such as a vibration.

In addition, the control switching signal of FIG. 11(*b*) may be linked with a movement of the galvanometer mirror 219 controlling the reference light angle to a next reference angle (for example, Φ2). Or, a threshold value (for example, 20% of a maximum light amount) may be set to a detection light amount of a light detector 225 and if the light amount is less than the threshold value, a signal to switch logic may be generated by a signal generation circuit 86. In examples of FIGS. 11(*e*) and 11(*f*), drive frequencies of the actuator are different in the reproduction course and the movement course. This is because a signal band used for control is changed. The drive frequency is not limited in particular and the signal band may be matched.

Different from FIGS. 11(*a*) to 11(*f*), FIGS. 17(*a*) to 17(*d*) illustrate an example of the case in which position control of the spatial filter 214 is executed without using the control switching signal. If the reproducing reference light is radiated to the optical information recording medium 1 on which a plurality of books are recorded, the reproduced light 206 is obtained from an area described as a page in FIG. 17(*a*). A position error signal is generated by the signal generation circuit 86 using a signal not passing through the aperture portion 101 of the spatial filter 214 in the reproduced light 206. However, the position error signal is not generated or cannot be generated from an area where a page is not recorded. For this reason, the position error signal based on the reproduced light 206 becomes an intermittent signal as illustrated in FIG. 17(*b*). In addition, because an output of the position detection sensor 227 is unrelated to the reproduced light 206, the output is as illustrated in FIG. 17(*c*). If weighted addition (addition with 1:1 in FIG. 17) is applied to FIGS. 17(*b*) and 17(*c*) by the servo signal generation circuit 83, a result thereof is as illustrated in FIG. 17(*d*). For this reason, it is not necessary to switch the control as illustrated in FIGS. 11(a) to 11(f). The actuator 226 is driven by the servo control circuit 84 using a position error signal by the weighted addition, so that the spatial filter 214 can be positioned. This is applicable to a third embodiment.

Figure 13A:
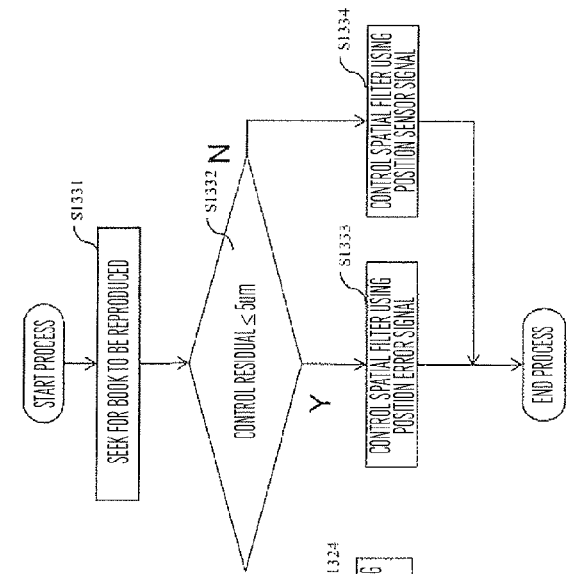
FIGS. 13A to 13C illustrate operation flows of the optical information recording/reproducing device according to the second embodiment of the present invention and FIG. 13A illustrates an operation flow of switching of position control based on the reproduced light amount with respect to the spatial filter at the time of reproduction in a book, FIG.

FIG. 13(a) illustrates an operation flow of position control of the spatial filter at the time of reproduction in a book. When a book to be reproduced is reproduced, a seek operation (S1311) for controlling an access control circuit 81 and adjusting positions of the pickup 11 and a reproducing reference light optical system 12 to a prescribed position of the optical information recording medium is executed. At this time, when the optical information recording medium 1 has address information, the address information is reproduced and it is confirmed whether a target material is arranged at a target position. When the target material is not arranged at the target position, a deviation amount with the prescribed position is calculated and a positioning operation is repeated. Next, a page is reproduced while an incidence angle of the reference light incident on the optical information recording medium 1 is rotated by a minute amount (for example, 0.1 degrees) by the galvanometer mirror 219 (S1312). In addition, detection of the reproduced light from the page is performed by an imaging element 225, a total sum of reproduced light amounts is generated by the signal generation circuit 86, and it is determined whether the generated reproduced light amount is 20% or more (S1313). The reproduced light amount is reduced when the galvanometer mirror 219 rotates. As a determination result in S1313, when the generated reproduced light amount is 20% or more, the position error signal is generated by the signal generation circuit 86, the servo control circuit 84 drives the actuator 226 using the position error signal, and the position control of the spatial filter 214 is executed (S1314). Here, as the determination result in S1313, when the generated reproduced light amount is less than 20%, the actuator 226 is driven by the servo control circuit 84 according to an output of the position detection sensor 227 (S1315).

Figure 13B:
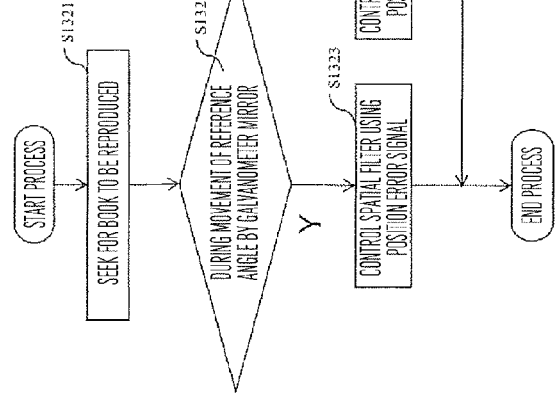

In addition, as illustrated in FIG. 13(b), it may be determined whether the galvanometer mirror 219 to control the reference light angle is moving to a next reference angle (for example, Φ2) (S1322). For example, a controller may output a control switching signal after an output of a signal moving to the next reference angle (for example, Φ2). Because S1321, S1323, and S1324 are the same as S1311, S1314, and S1315, description thereof is omitted.

Figure 13C:
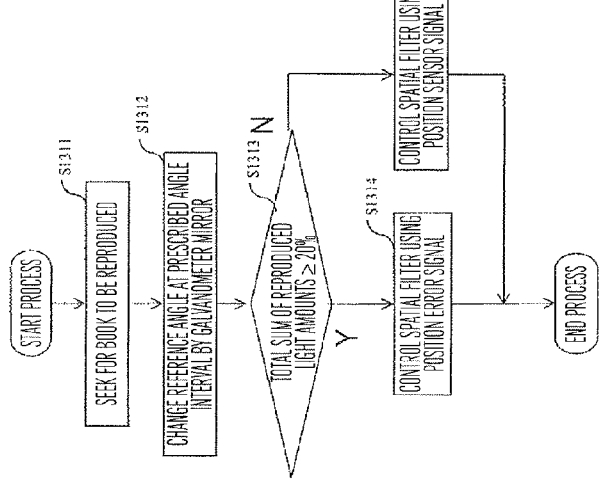

In addition, as illustrated in FIG. 13(c), it is determined whether a control residual is a prescribed amount or less (for example, 5 um or less) (S1332). When the control residual is the prescribed amount or less, the actuator 226 may be driven by the servo control circuit 84 according to the output of the position detection sensor 227 (S1334). Here, the control residual is a control residual of the spatial filter 214 when the position error signal is used. A control residual amount may be calculated from the position error signal.

Because S1331, S1333, and S1334 are the same as S1321, S1323, and S1324, description thereof is omitted.

According to this embodiment described above, control based on the position error signal is executed in an area where the reproduced light is obtained and control based on the position detection sensor signal of the position detection sensor such as the PSD is executed in an area where the reproduced light is not obtained or small, according to the control switching signal, so that it is easy to control the spatial filter in the area Y as compared with the first embodiment.

For example, if surface wobbling is about 50 umpp at the time of moving from a currently reproduced book to a different book, after switching SZ of control of the spatial filter 214 into control by the position detection sensor 227 and moving to the corresponding book, feedback control is applied, so that high-speed reproduction can be realized as compared with the case in which control is executed after control interruption. This is applicable to other embodiments.

Third Embodiment

A third embodiment of the present invention will be described using FIGS. 12(a) to 12(f). Content that is described in the first embodiment and is not described in this embodiment is applicable to this embodiment, as long as there are not special circumstances. An entire configuration and an operation flow of an optical information recording/reproducing device are the same as those in the first embodiment and description thereof is omitted in this embodiment.

Figure 12A:
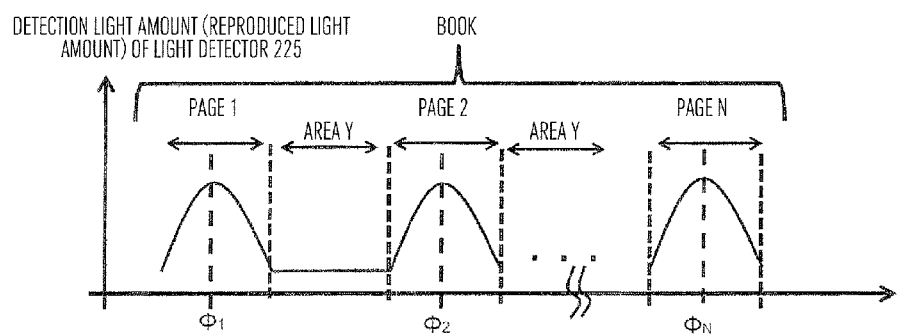
FIG. 12A illustrates a light amount when a hologram formed by reference light angles $\Phi1, \Phi2, \ldots, \Phi N$ to be incident on an optical information recording medium in an optical information recording/reproducing device and signal light is detected by a light detector.

FIGS. 12(a) to 12(f) are schematic diagrams of control of a spatial filter in a pickup in the optical information recording/reproducing device according to this embodiment. As described in the recording course of the hologram illustrated in FIG. 3 corresponding to the first embodiment, a page is recorded while an incidence angle of reference light incident on an optical information recording medium 1 is rotated by a minute amount (for example, 0.1 degrees) by a galvanometer mirror 219. For this reason, if reproducing reference light is radiated to the optical information recording medium 1 on which a plurality of books are recorded, reproduced light 206 is obtained from a certain reference light angle (for example, Φ1, Φ2, ..., ΦN; where N is a natural number), as illustrated in FIG. 12(a). A position error signal is generated by a signal generation circuit 86 using a signal not passing through an aperture portion 101 of a spatial filter 214 in the reproduced light 206. However, a position error signal is not generated from an area Y where a page is not recorded.

Figures 12B, 12C, 12D, 12E, 12F:
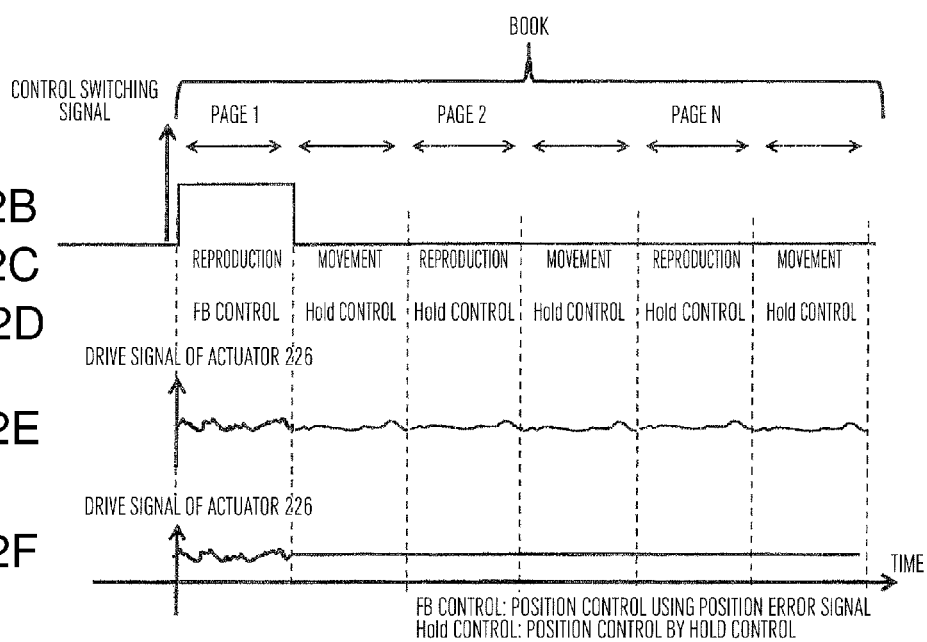
FIG. 12B illustrates a reproduced light amount of the hologram at the time of reproduction or a control switching signal generated by a movement of a galvanometer mirror.
FIG. 12C illustrates a sequence flow at the time of reproduction, showing the reproduction course and the movement course of the galvanometer mirror controlling the reference light angle.
FIG. 12D illustrates a flow of control switching of a spatial filter in a pickup for a sequence of FIG. 12C.
FIG. 12E illustrates a drive signal waveform of an actuator positioning the spatial filter when a sensor showing a position is used in the spatial filter in the pickup.
FIG. 12F illustrates an example of a drive signal waveform of the actuator positioning the spatial filter when the sensor showing the position is not used in the spatial filter in the pickup.

Therefore, according to reproduction of the page and a movement of the galvanometer mirror 219 controlling the reference light angle as illustrated in FIG. 12(c), by control switching illustrated in FIG. 13(b), as illustrated in FIG. 12(d), a position error signal is generated from the reproduced light 206 of a reproduced first page (for example, a page of a lowest angle among rotation angles of the galvanometer mirror 219) (described as first page in the same drawing)) of a certain book, a page of a highest angle (Nth page in the same drawing), or a page reproduced from any position of the book, an actuator 226 is driven by a servo control circuit 84 using the position error signal, the actuator 226 is driven by the servo control circuit 84 according to an output of a position detection sensor 227 in reproduction after a next page, and the spatial filter 214 is positioned. For the control switching, for example, a signal linked with rotation of the galvanometer mirror 219 controlling the reference light angle to a next page may be used and when a detection light amount of a light detector 225 is less than a threshold value (for example, 20% of a maximum light amount), a signal to switch logic may be used, Here, if a position of the spatial filter 214 is detected by the position detection sensor 227 and the actuator 226 is driven by the servo control circuit 84 according to an output of the position detection sensor 227, a drive signal of the actuator 226 is as illustrated in FIG. 12(e) and if the position detection sensor 227 is not used, simple Hold control (in the case of voltage drive, a voltage is maintained at a constant value) is executed after first positioning, as illustrated in FIG. 12(*f*). In addition, a control switching signal of FIG. 12(*b*) may be synchronized with a movement of the galvanometer mirror 219 controlling the reference light angle to a next reference angle (for example, Φ2). Or, a threshold value (for example, 20% of a maximum light amount) may be set to a detection light amount of a light detector 225 and if the light amount is less than the threshold value, a signal to switch logic may be generated by a signal generation circuit 86 and may be used.

Figure 14:
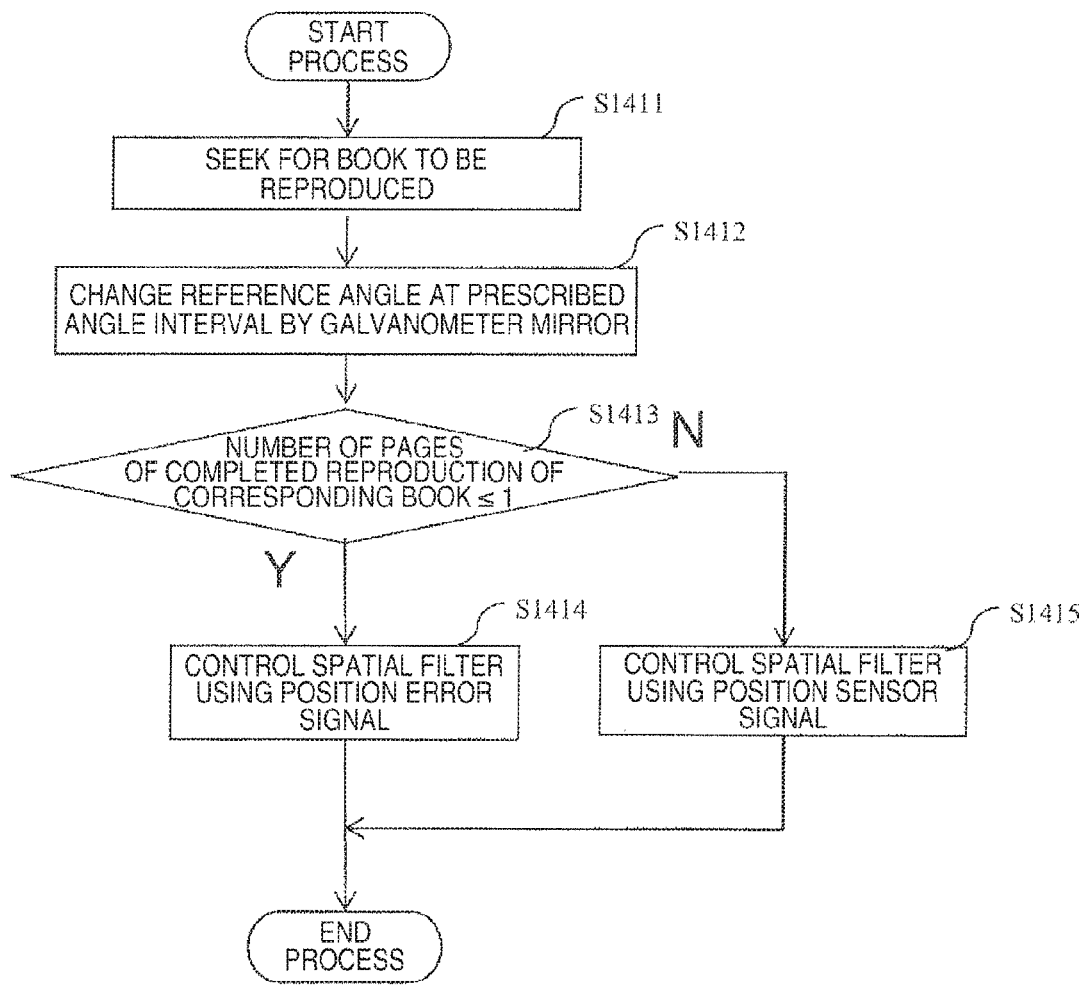
FIG. 14 illustrates an operation flow of switching of position control of the spatial filter at the time of reproduction in a book in the optical information recording/reproducing device according to the third embodiment of the present invention.

FIG. 14 illustrates an operation flow of position control of the spatial filter at the time of reproduction in a book in this embodiment, When a book to be reproduced is reproduced, a seek operation (S1411) for controlling an access control circuit 81 and adjusting positions of the pickup 11 and a reproducing reference light optical system 12 to a prescribed position of the optical information recording medium is executed. At this time, when the optical information recording medium 1 has address information, the address information is reproduced and it is confirmed whether a target material is arranged at a target position. When the target material is not arranged at the target position, a deviation amount with the prescribed position is calculated and a positioning operation is repeated. Next, a page is reproduced while an incidence angle of the reference light incident on the optical information recording medium 1 is rotated by a minute amount (for example, 0.1 degrees) by the galvanometer mirror 219 (S1412). Here, it is determined whether reproduction of a certain page (for example, a page of a prescribed amount of a low angle side of the book) of the book to be reproduced has been completed (S1413). As a determination result in S1413, when one page or less is reproduced, a position error signal is generated from the reproduced light 206 by the signal generation circuit 86, the actuator 226 is driven by the servo control circuit 84 using the position error signal, and the position control of the spatial filter 214 is executed (S1414). Here, as the determination result in S1413, when one page is already reproduced, the position error signal is not generated from the reproduced light 206 and the actuator 226 is driven by the servo control circuit 84 according to the output of the position detection sensor 227 (S1315). The determination of S1413 on whether one page or less has been reproduced is not limited to one page.

According to this embodiment, the control based on the reproduced light of the hologram is executed in only the first page and the Hold control based on the PSD is executed in the following pages, so that it is not necessary to switch the control for every two courses of the reproduction and the movement, as illustrated in FIG. 11(*c*). Therefore, high-speed reproduction of the optical information recording medium can be realized as compared with the second embodiment.

Fourth Embodiment

A fourth embodiment of the present invention will be described using FIGS. 15(*a*) and 15(*b*). Content that is described in the first embodiment and is not described in this embodiment is applicable to this embodiment, as long as there are not special circumstances. An entire configuration and an operation flow of an optical information recording/reproducing device are the same as those in the first embodiment and description thereof is omitted in this embodiment.

In this embodiment, as disclosed in Patent Literature 2, high-speed reproduction of a short stack is realized by adjusting a position of a spatial filter 214 having small inertia without changing a position of an optical information recording medium 1 or a rotation motor 50 having large inertia. FIGS. 15(*a*) and 15(*b*) are schematic diagrams of control of a spatial filter in a pickup in the optical information recording/reproducing device according to this embodiment. In this embodiment, a short stack is configured in a unit of 100 pages, one book is configured using four short stacks, and a size of each page is 800 um×400 um.

A method in which reference light is radiated to the optical information recording medium 1, reproduction of a hologram of a final page (in this embodiment, a 100th page) recorded on a short stack in a book ends, and the spatial filter 214 is positioned at a high speed in an x direction of the optical information recording medium 1 to reproduce a next short stack will be described.

If reproducing reference light is radiated to the optical information recording medium 1 on which a plurality of books are recorded, a position error signal is generated using a signal not passing through an aperture portion 101 of the spatial filter 214 in reproduced light 206, an actuator 226 is driven by a servo control circuit 84 such that the position error signal becomes 0, and the spatial filter 214 is positioned. Here, a control target of the spatial filter 214 changes from 0 to 200 um using a position error signal SX of the x direction to reproduce a first page (101st page in a total number of reproduction pages) of (ii) from reproduction of a 100th page of (i) in FIGS. 15(*a*) and 15(*b*), the spatial filter 214 moves from a position optimal for reproduction of the 100th page of (i) in FIGS. 15(*a*) and 15(*b*) to the vicinity (for example, ±10 um) of a position optimal for reproduction of the first page of (ii) in FIGS. 15(*a*) and 15(*b*), and positioning is performed. During the movement of the spatial filter, a reference light angle is set to an angle corresponding to the 100th page. After the movement, the reference light angle is set to an angle corresponding to the 101st page and the control target returns to 0.

FIG. 15(*b*) illustrates an example of a profile of control when the spatial filter is positioned on the basis of the position error signal, with respect to a positioning target. When the control target is 0 and the 100th page is reproduced, the spatial filter is positioned at (i–1) in FIG. 15(*b*). Here, if the control target changes from 0 to 200 um and the spatial filter 214 is driven using the position error signal SX, the spatial filter moves from (i–1) to (i–2). In addition, if the control target changes from 200 um to 0 and the reference light angle is set to the angle corresponding to the 101st page, the spatial filter moves from (i–2) to (ii–1).

In addition, information regarding a movement amount of the short stack, for example, 200 um may be recorded on a memory in the device, the optical information recording medium, or a cartridge and the information of the movement amount of the short stack may be read at the time of reproduction.

In addition, the spatial filter 214 may be moved by a drive voltage corresponding to 200 um converted from SX by feed forward control, without changing a control target of feedback control. As a result, if the reference light angle is changed to a prescribed angle by a galvanometer mirror 219 to reproduce the first page of the short stack of (ii) in FIGS. 15(*a*) and 15(*b*), the spatial filter is already positioned at the vicinity of the position suitable for reproduction of the first page of the short stack of (ii) in FIGS. 15(*a*) and 15(*b*). Therefore, the reproduced light 206 is obtained. The position error signal SX is generated from the reproduced light 206 and the actuator 226 is driven such that the signal error signal becomes 0. Thereby, in the spatial filter 214, control optimal for reproduction of a hologram of the short stack of (ii) in FIGS. 15(*a*) and 15(*b*) can be realized. In this method, the hologram of the short stack in the x direction is reproduced, so that positioning of the spatial filter 214 is enabled in parallel to a movement time of the galvanometer mirror 219, and high density and high-speed reproduction of the optical information recording medium can be realized.

Figure 15A:
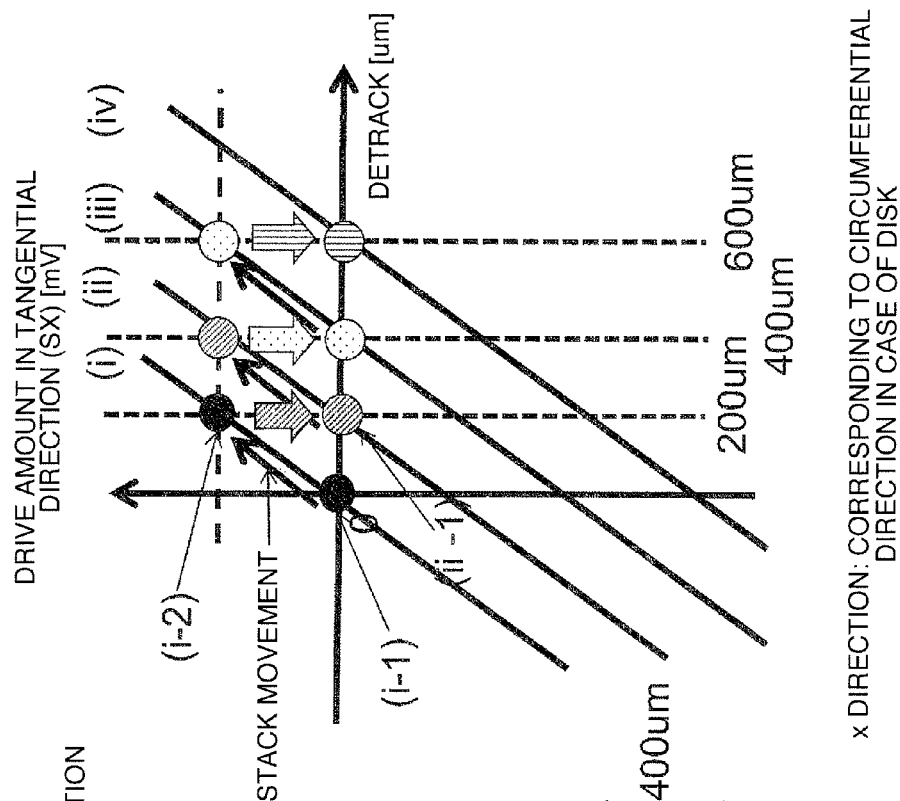
FIG. 15A illustrates a positioning target of a spatial filter in a pickup in the case in which a book is recorded using four short stacks in an optical information recording/reproducing device and FIG. 15B illustrates an example of a profile of control in the case in which the spatial filter in the pickup is positioned on the basis of a position error signal, with respect to the positioning target of FIG. 15A.
Figure 15B:
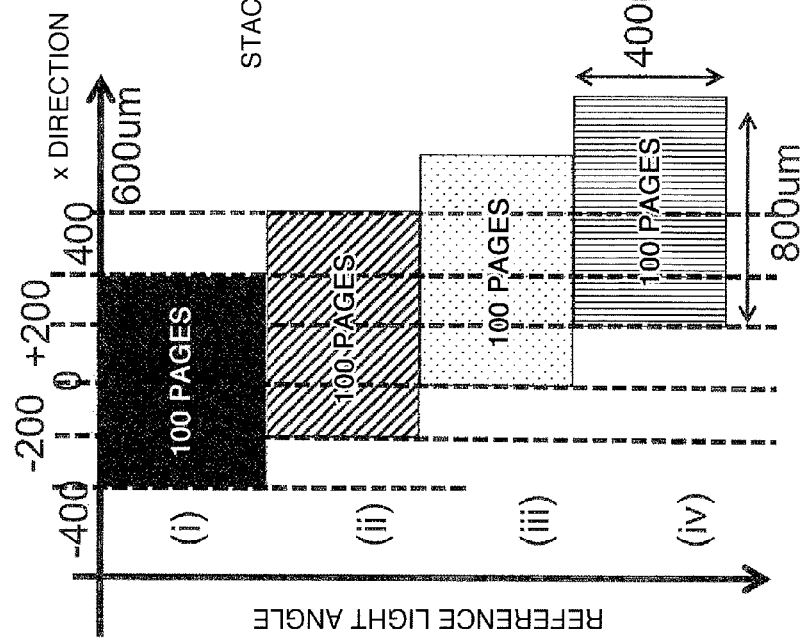

In addition, even though FIGS. 15(a) and 15(b) are configured like FIGS. 18(a) and 18(b), the same effect is obtained. FIGS. 18(a) and 18(b) are different from FIGS. 15(a) and 15(b) in that the spatial filter is moved after the reference light angle is set to an angle corresponding to a page becoming a next reproduction object.

For example, feedback control of an x axis direction of the spatial filter 214 is interrupted to reproduce a first page (101st page in a total number of reproduction pages) of (ii) from reproduction of a 100th page of (i) in FIGS. 18(a) and 18(b), the reference light angle incident on the optical information recording medium 1 is adjusted to the first page of (ii) in FIGS. 18(a) and 18(b) by the galvanometer mirror 219, and the control target of the spatial filter 214 changes from 0 to 200 um using the position error signal SX of the x direction, so that the spatial filter 214 moves from a position optimal for reproduction of the 100th page of (i) in FIGS. 15(a) and 15(b) to the vicinity (for example, ±10 um) of a position optimal for reproduction of the first page of (ii) in FIGS. 18(a) and 18(b) Here, positioning optimal for the first page of (ii) in FIGS. 18(a) and 18(b) may be realized by positioning the spatial filter 214 according to the position error signal SX by the feedback control.

FIG. 18(b) illustrates an example of a profile of control when the spatial filter is positioned on the basis of the position error signal, with respect to a positioning target. When the control target is 0 and the 100th page is reproduced, the spatial filter is positioned at (i-1) in FIG. 18(b). Here, if the control target changes from 0 to 200 um and the reference light angle is set to an angle corresponding to the 101st page, the spatial filter 214 moves to (i-2). If the spatial filter comes close to (i-2), a reproduced light amount corresponding to the 100th page decreases, but a reproduced light amount corresponding to the 101st page increases. For this reason, if the reproduced light amount corresponding to the 100th page decreases extremely, the spatial filter is positioned at (i-3) of FIG. 18(b). At this time, the control target may be changed from 200 um. Then, the control target is changed to 0, so the spatial filter can move from (i-3) to (ii-1), and the spatial filter can be positioned at the 101st page.

FIG. 16 illustrates an operation flow of a position movement of the spatial filter at the time of reproduction in a book in this embodiment. When a book to be reproduced is reproduced, a seek operation (S1611) for controlling an access control circuit 81 and adjusting positions of a pickup 11 and a reproducing reference light optical system 12 to a prescribed position of the optical information recording medium is executed. At this time, when the optical information recording medium 1 has address information, the address information is reproduced and it is confirmed whether a target material is arranged at a target position. When the target material is not arranged at the target position, a deviation amount with the prescribed position is calculated and a positioning operation is repeated. Next, a page is reproduced while an incidence angle of the reference light incident on the optical information recording medium 1 is rotated by a minute amount (for example, 0.1 degrees) by the galvanometer mirror 219 (S1612). Here, when a book is recorded on the optical information recording medium 1 with the short stacks, a reproduction page number and a unit short stack number (in this example, 100 pages are compared and determined (S1613). As a determination result in S1613, when the reproduction page number is 100 pages or less, a position error signal is generated from the reproduced light 206 by the signal generation circuit 86, the servo control circuit 84 drives the actuator 226 using the position error signal, and the spatial filter 214 is positioned (S1614). Here, as the determination result in S1613, when the next 101st page is reproduced by moving the galvanometer mirror 219, the actuator 226 is driven by the servo control circuit 84 according to an output of a position detection sensor 227 and the spatial filter 214 is positioned (S1615).

Next, position control of an X direction is executed to move the spatial filter 214 in the X direction (S1616). Then, the spatial filter 214 is moved by 200 um (here, a size of a hologram is set as 400×800 um), on the basis of a position error signal obtained from the reproduced light 206 of the 100th page (S1617). Here, the comparison and determination may be executed by determining whether a value obtained by subtracting the integral multiple of the unit short stack number from the reproduction page number is 1. In this case, when the value is 2 or more, the process proceeds to S1614 and when the value is 1, the process proceeds to S1615.

Figure 20:
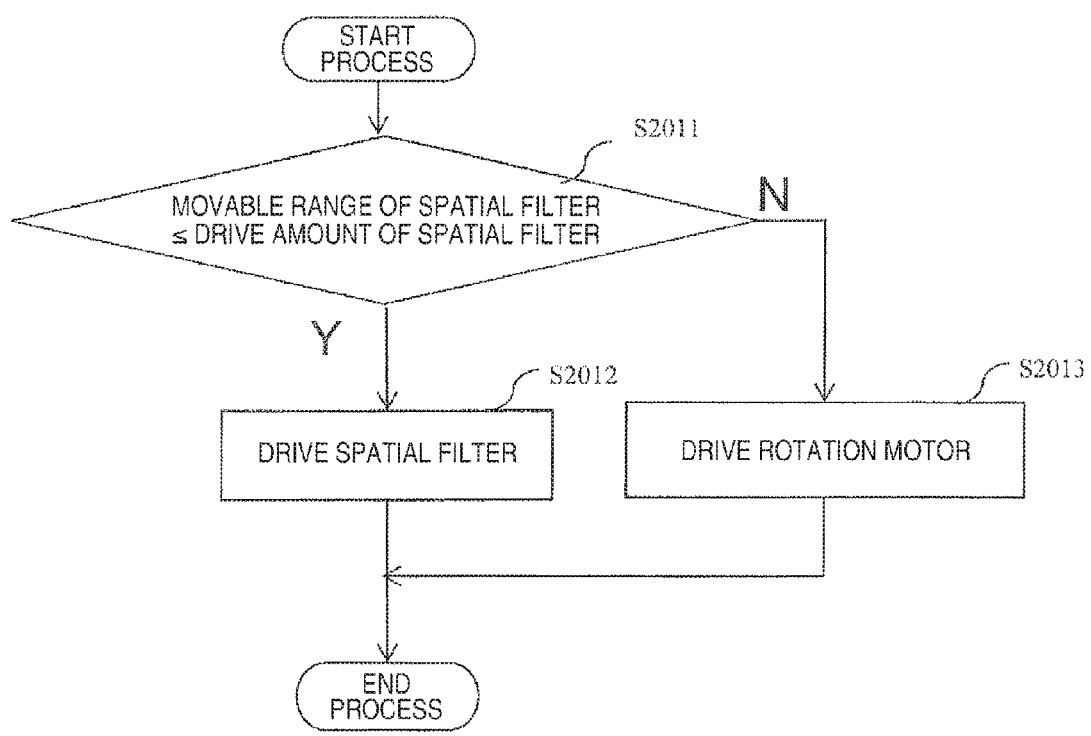
FIG. 20 illustrates an example of an operation flow of positioning by the spatial filter in the pickup and a rotation motor in the optical information recording/reproducing device according to the fourth embodiment of the present invention.

In addition, as illustrated in FIG. 20, when a next book is reproduced, a drive amount of the spatial filter and a movable range of the spatial filter are compared (S2011). When the drive amount of the spatial filter is smaller, positioning is performed by the spatial filter 214 (S2012) and when the drive amount is beyond the movable range of the spatial filter 214, positioning may be performed by a rotation motor 50 (S2013). As a result, even when the next book is reproduced, high-speed reproduction is enabled.

Figure 21:
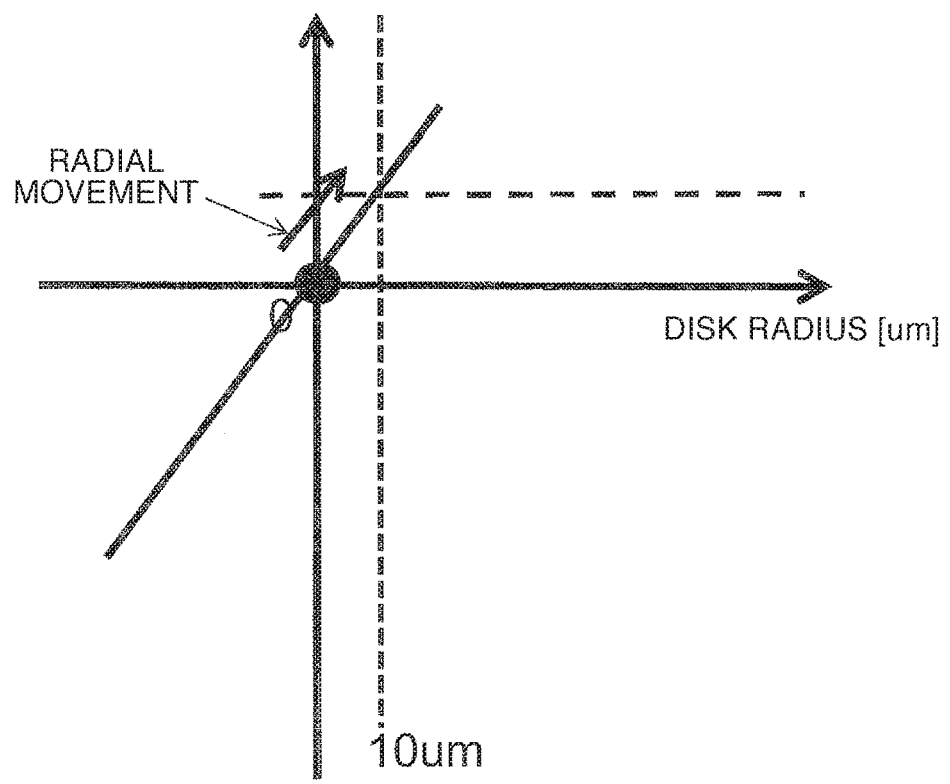
FIG. 21 illustrates an example of an operation flow of a position movement of the spatial filter in the pickup in the optical information recording/reproducing device according to the fourth embodiment of the present invention.

In addition, positioning in a radial direction can be realized with the same configuration by generating a position error signal using a signal not passing through an aperture portion 101 of the spatial filter 214 in the reproduced light 206 and performing a movement of the radial direction on the basis of the position error signal, as illustrated in FIG. 21.

As such, according to this embodiment, high-speed reproduction of a hologram of the short stack is enabled.

Fifth Embodiment

A fifth embodiment of the present invention will be described using FIG. 19. Content that is described in the first embodiment and is not described in this embodiment is applicable to this embodiment, as long as there are not special circumstances. In this embodiment, a different example of control of a spatial filter 214 will be described. An entire configuration and an operation flow of an optical information recording/reproducing device are the same as those in the first embodiment and description thereof is omitted in this embodiment.

Figure 19:
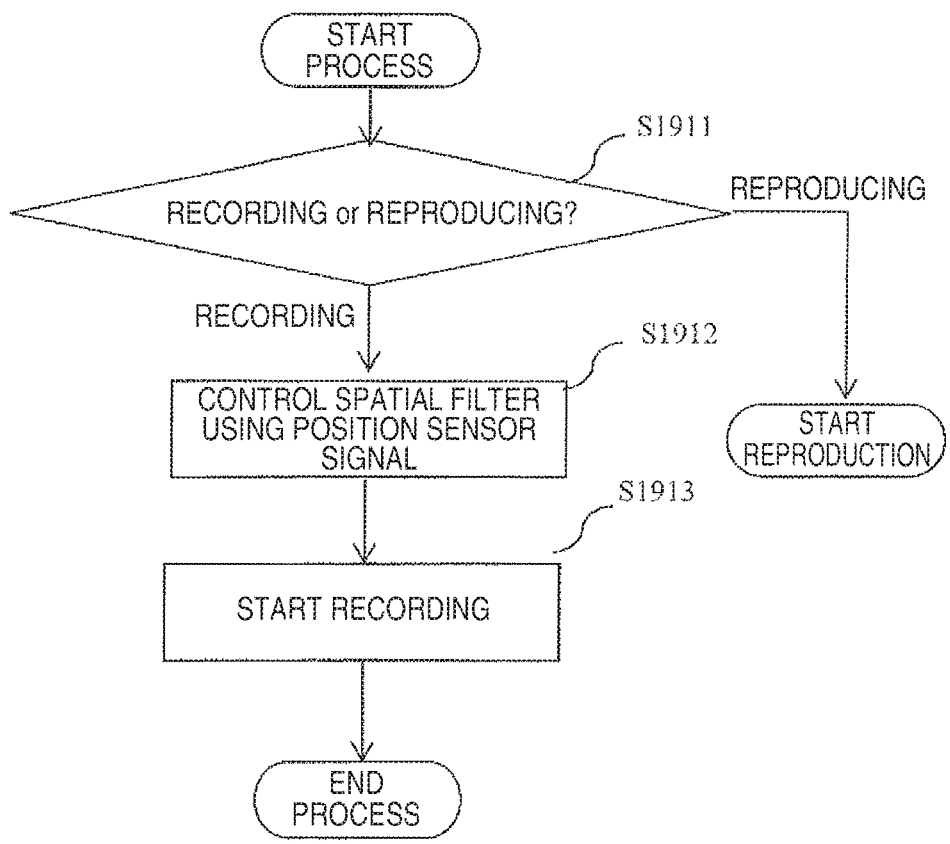
FIG. 19 illustrates an example of an operation flow of a position movement of a spatial filter in a pickup in an optical information recording/reproducing device according to a fifth embodiment of the present invention.

FIG. 19 illustrates an operation flow of a spatial filter at the time of recording in this embodiment.

If a preparation for recording or reproduction is completed, it is determined whether recording is performed or reproduction is performed (S1911). When it is determined that recording is performed, an actuator 226 is driven by a servo control circuit 84 according to an output of a position detection sensor 227 and position control of the spatial filter 214 is executed (S1912). In addition, recording starts (S1913). For stable recording, a position of the spatial filter 214 is preferably controlled to be fixed during recording. For this reason, when information such as user data is recorded by radiating at least signal and reference light to the optical information recording medium, the position of the spatial filter 214 is preferably controlled to be fixed. A reproduction process in which it is determined in S1911 that reproduction is performed starts.

According to this embodiment, stable recording and high-speed reproduction can be realized.

The present invention is applicable to other method such as a shift multiplexing method as well as an angle multiplexing method.

The present invention is not limited to the embodiments described above and various modifications are included in the present invention. For example, the embodiments described above are described in detail to facilitate the understanding, of the present invention and are not limited to embodiments in which all of the described configurations are included. In addition, a part of the configurations of the certain embodiment can be replaced with the configurations of other embodiment or the configurations of other embodiment can be added to the configurations of the certain embodiment. In addition, for a part of the configurations of the individual embodiments, other configurations can be added, removed, or replaced.

In addition, a part or all of the individual configurations, functions, processing units, and processing mechanisms may be designed by integrated circuits and may be realized by hardware. In addition, the individual configurations and functions may be realized by software by analyzing programs for realizing the individual functions by a processor and executing the programs by the processor. Information such as the programs, the tables, and the files for realizing the individual functions may be stored in a recording device such as a memory, a hard disk, and a solid state drive (SSD) or a recording medium such as an IC card, an SD card, and a DVD.

In addition, only control lines or information lines necessary for explanation are illustrated and the control lines or information lines do not mean all control lines or information lines necessary for a product. In actuality, almost all configurations may be connected to each other.

REFERENCE SIGNS LIST 101 aperture portion,
102 reflection portion
103a, b, c, d lens
104a, b, c, d light detector
1 optical information recording medium
10 optical information recording/reproducing device
11 pickup
12 reproducing reference light optical system
13 cure optical system
14 disk rotation angle detecting optical system
50 rotation motor
81 access control circuit
82 light source drive circuit
83 servo signal generation circuit
84 servo control circuit
85 signal processing circuit
86 signal generation circuit
87 shutter control circuit
88 disk rotation motor control circuit
89 controller
90 input/output control circuit
91 external control device
201 light source
202 collimating lens
203 shutter
204 ½ wavelength plate
205 polarization beam splitter
206 signal light (reproduced light)
206a, b, c, d reproduced light
207 reference light
208 beam expander
209 phase mask
210 relay lens
211 polarization beam splitter
212 spatial light modulator
213 relay lens
214 spatial filter
215 objective lens
216 polarization direction conversion element
217 mirror
218 mirror
219 galvanometer mirror
220 actuator
221 lens
222 lens
223 actuator
224 galvanometer mirror
225 imaging element
226 actuator
227 position detection sensor

The invention claimed is:

1. An optical information device for at least one of reproducing information from and recording information on an optical information recording medium on which an interference pattern of signal light and reference light is recorded as a hologram, comprising:
   an optical system that emits a light beam;
   an aperture portion that causes at least a part of reproduced light obtained when the light beam from the optical system is radiated onto the optical information recording medium to pass therethrough;
   a first detection unit that detects at least a part of the reproduced light;
   a second detection unit that detects a position of the aperture portion;
   a control unit that controls the position of the aperture portion based on a first signal obtained from the first detection unit and a second signal obtained from the second detection unit; and
   a reproduced light amount detection unit that detects a reproduced light amount based on the reproduced light;
   wherein the control unit switches a control state of the aperture portion by switching the first signal and the second signal; and
   wherein the control unit switches a control state of the aperture portion by switching the first signal and the second signal, according to a detection result of the reproduced light amount detection unit.

2. The optical information device according to claim 1, wherein the control unit has a control state in which the position of the aperture portion is controlled to be fixed based on the position detection signal.

3. The optical information device according to claim 1, comprising:
   a split element that splits light emitted from the light source unit into signal light and reference light; and
   a spatial light modulator for adding two-dimensional information to the signal light,
   wherein the control unit controls the aperture portion by the second signal when information is recorded on an optical information recording medium.

4. An optical information device for at least one of reproducing information from and recording information on an optical information recording medium, comprising:
- an optical system that emits a light beam;
- an aperture portion that causes at least a part of reproduced light obtained when the light beam from the optical system is radiated onto the optical information recording medium to pass therethrough;
- a detection unit that detects at least a part of the reproduced light;
- a control unit that has a first control state in which a position of the aperture portion is controlled based on a first signal obtained from the detection unit and a second control state in which a position of the aperture portion is controlled to be fixed or is controlled based on a position detection sensor; and
- a reproduced light amount detection unit that detects a reproduced light amount based on the reproduced light;
- wherein the control unit switches the first control state and the second control state according to a detection result of the reproduced light amount detection unit.

5. The optical information device according to claim 4, wherein the control unit executes the second control state when information is recorded on an optical information recording medium.

6. An optical information processing method for at least one of reproducing information from and recording information on an optical information recording medium on which an interference pattern of signal light and reference light is recorded as a hologram, comprising:
- an emission step of emitting a light beam;
- an aperture portion step of causing at least a part of reproduced light obtained when the light beam emitted by the emission step is radiated onto the optical information recording medium to pass through an aperture portion;
- a first detection step of detecting at least a part of the reproduced light;
- a second detection step of detecting a position of the aperture portion;
- a third detection step of detecting a reproduced light amount based on the reproduced light; and
- a control step of controlling the position of the aperture portion based on a first signal obtained at the first detection step and a second signal obtained at the second detection step and based on a detection result of detecting the reproduced light amount.

7. An optical information processing method for at least one of reproducing information from and recording information on an optical information recording medium, comprising:
- an emission step of emitting a light beam;
- an aperture portion step of causing at least a part of reproduced light obtained when the light beam emitted by the emission step is radiated onto the optical information recording medium to pass through an aperture portion;
- a detection step of detecting at least a part of the reproduced light;
- a first control step of controlling a position of the aperture portion based on a first signal obtained at the detection step;
- a second control step of controlling the position of the aperture portion to be fixed or to be based on a position detection sensor;
- a second detection step of detecting a reproduced light amount based on the reproduced light; and
- a third control step of switching a control state of the aperture portion by switching the first signal and the second signal according to a detection result of detecting the reproduced light amount.

8. An optical information device for reproducing information from an optical information recording medium on which pages are recorded using reference light and signal light, comprising:
- an optical system that emits reference light;
- an angle control unit that controls an incidence angle of the reference light from the optical system on an optical information recording medium;
- an aperture portion that causes at least a part of reproduced light obtained when the reference light from the angle control unit is radiated onto an optical information recording medium to pass therethrough; and
- a control unit that has a control state in which a position of the aperture portion is controlled to be fixed or to be based on a position detection sensor, during at least a part of a period when the angle control unit is moving from an angle corresponding to a first page to an angle corresponding to a second page;
- wherein a book having a plurality of pages including the first page and the second page is recorded on the optical information recording medium, and
- wherein the control unit switches the control state of the aperture portion by switching the first page and the second page according to whether reproduction of pages of a prescribed amount in the pages included in the book has been completed.

9. An optical information device for reproducing information from an optical information recording medium, comprising:
- an optical system that emits a light beam;
- an aperture portion that causes at least a part of reproduced light obtained when the light beam from the optical system is radiated onto the optical information recording medium to pass therethrough;
- a control unit that has a control state in which a position of the aperture portion is controlled to be fixed or to be based on a position detection sensor, during at least a part of a period when the optical system or the optical information recording medium is moving; and
- a medium drive unit that moves or rotates the optical information recording medium,
- wherein the control unit compares a drive amount of the aperture portion and a movable range of the aperture portion, and either moves the aperture portion or moves or rotates the optical information recording medium by the medium drive unit based on a comparison result of the control unit.

* * * * *